United States Patent
Karaki et al.

(10) Patent No.: US 10,172,158 B2
(45) Date of Patent: Jan. 1, 2019

(54) SYSTEMS AND METHODS FOR SELF-DEFERRAL WITH DOWNLINK AND UPLINK TRANSMISSION OPPORTUNITY SHARING

(71) Applicant: Telefonaktiebolaget LM Ericsson (publ), Stockholm (SE)

(72) Inventors: Reem Karaki, Aachen (DE); Jung-Fu Cheng, Fremont, CA (US); Amitav Mukherjee, Fremont, CA (US)

(73) Assignee: Telefonaktlebolaget LM Ericsson (publ), Stockholm (SE)

( * ) Notice: Subject to any disclaimer, the term of this patent is extended or adjusted under 35 U.S.C. 154(b) by 87 days.

(21) Appl. No.: 15/090,005

(22) Filed: Apr. 4, 2016

(65) Prior Publication Data

US 2017/0290059 A1 Oct. 5, 2017

(51) Int. Cl.
*H04L 5/00* (2006.01)
*H04W 16/14* (2009.01)
(Continued)

(52) U.S. Cl.
CPC ......... *H04W 74/0816* (2013.01); *H04L 5/001* (2013.01); *H04L 5/0098* (2013.01); *H04W 16/14* (2013.01); *H04W 72/042* (2013.01); *H04W 72/0413* (2013.01); *H04W 24/08* (2013.01); *H04W 24/10* (2013.01); *H04W 72/0446* (2013.01); *H04W 72/1205* (2013.01); *H04W 74/04* (2013.01); *H04W 84/12* (2013.01)

(58) Field of Classification Search
CPC ............. H04W 74/0816; H04W 16/14; H04W 72/042; H04W 72/0413; H04W 74/04; H04W 72/1205; H04W 84/12; H04W 24/10; H04W 72/0446; H04W 24/08; H04L 5/00
See application file for complete search history.

(56) References Cited

U.S. PATENT DOCUMENTS

2015/0049715 A1 2/2015 Yerramalli et al.
2015/0373741 A1 12/2015 Yerramalli et al.
(Continued)

OTHER PUBLICATIONS

3GPP TSG RAN WG1, R1-157922: "Introduction of LAA (eNB Channel Access Procedures)", Sep. 2015, 3GPP.*
3GPP TSG RAN WG1 82 Meeting; R1-154342; Agenda Item: 7.2.4.1; Source: Huawei, HiSilicon; Title: Multicarrier operation for LAA DL—Beijing, China, Aug. 24-28, 2015.
(Continued)

*Primary Examiner* — Brian T O Connor
(74) *Attorney, Agent, or Firm* — Baker Botts, LLP

(57) ABSTRACT

According to certain embodiments, a method for self-deferring transmissions in a multi-carrier network includes determining, by a first controller seeking to initiate a carrier sensing procedure in a first cell operating on a first carrier, that a second cell associated with a second controller has initiated a first transmission opportunity on a second carrier that is adjacent to the first carrier. The first controller determines a first transmission opportunity duration associated with the first transmission opportunity initiated in the second cell. The first controller defers the carrier sensing procedure to be performed in the first cell by the first transmission opportunity duration. The carrier sensing procedure in the first cell is initiated after the first transmission opportunity duration unless instructed by the second controller.

24 Claims, 19 Drawing Sheets

(51) Int. Cl.
*H04W 24/08* (2009.01)
*H04W 24/10* (2009.01)
*H04W 72/04* (2009.01)
*H04W 72/12* (2009.01)
*H04W 74/04* (2009.01)
*H04W 74/08* (2009.01)
*H04W 84/12* (2009.01)

(56) References Cited

U.S. PATENT DOCUMENTS

| | | | | |
|---|---|---|---|---|
| 2016/0135143 A1* | 5/2016 | Won | | H04W 72/005 370/312 |
| 2016/0143014 A1* | 5/2016 | Mukherjee | | H04W 74/0816 370/330 |
| 2017/0048718 A1* | 2/2017 | Kim | | H04W 16/14 |
| 2017/0311320 A1* | 10/2017 | Lunttila | | H04W 16/14 |
| 2017/0325115 A1* | 11/2017 | Matsumoto | | H04W 16/14 |
| 2018/0049243 A1* | 2/2018 | Lee | | H04W 74/0833 |
| 2018/0063736 A1* | 3/2018 | Sadeghi | | H04W 24/10 |

OTHER PUBLICATIONS

3GPP TSG RAN WG1 Meeting #82; R1-154573; Agenda Item: 7.2.4.1; Source: Alcatel-Lucent Shanghai Bell, Alcatel-Lucent; Title: Multi-carrier LBT operation for LAA—Beijing, China, Aug. 24-28, 2015.

PCT Written Opinion of the Intereneational Searching Authority (PCT/ISA/237), for International Application No. PCT/SE2017/050293—dated Jun. 30, 2017.

PCT International Search Report (PCT/ISA/210) for International Application No. PCT/SE2017/050293—dated Jun. 30, 2017.

3GPP TS 36.211 v11.4.0; Technical Specification; 3rd Generation Partnership Project; Technical Specification Group Radio Access Network; Evolved Universal Terrestrial Radio Access (E-UTRA); Physical channels and modulation (Release 11)—Sep. 2013.

3GPP TS 36.213 v11.4.0; Technical Specification; 3rd Generation Partnership Project; Technical Specification Group Radio Access Network; Evolved Universal Terrestrial Radio Access (E-UTRA); Physical layer procedures (Release 11)—Sep. 2013.

3GPP TS 36.331 v11.5.0; Technical Specification; 3rd Generation Partnership Project; Technical Specification Group Radio Access Network; Evolved Universal Terrestrial Radio Access (E-UTRA); Radio Resour4ce Control (RRC); Protocol specification (Release 11)—Sep. 2013.

* cited by examiner

SYSTEMS AND METHODS FOR SELF-DEFERRAL WITH DOWNLINK AND UPLINK TRANSMISSION OPPORTUNITY SHARING

TECHNICAL FIELD

The present disclosure relates, in general, to wireless communications and, more particularly, systems and methods for self-deferral with downlink and uplink transmission opportunity sharing.

BACKGROUND

The 3GPP Rel-13 feature "Licensed-Assisted Access" (LAA) allows LTE equipment to also operate in the unlicensed 5 GHz radio spectrum. The unlicensed 5 GHz spectrum is used as a complement to the licensed spectrum. An ongoing 3GPP Rel-14 work item adds UL transmissions to LAA. Accordingly, devices (i.e., LTE user equipment (UEs)) connect in the licensed spectrum (primary cell or PCell) and use carrier aggregation to benefit from additional transmission capacity in the unlicensed spectrum (secondary cell or SCell). Standalone operation of LTE in unlicensed spectrum is also possible and is under development by the MuLTEfire Alliance.

Regulatory requirements, however, may not permit transmissions in the unlicensed spectrum without prior channel sensing. Since the unlicensed spectrum must be shared with other radios of similar or dissimilar wireless technologies, a so-called listen-before-talk (LBT) method needs to be applied. LBT involves sensing the medium for a pre-defined minimum amount of time and backing off if the channel is busy. Today, the unlicensed 5 GHz spectrum is mainly used by equipment implementing the IEEE 802.11 Wireless Local Area Network (WLAN) standard, also known under its marketing brand as "Wi-Fi."

Both Wi-Fi and LAA may operate in multi-carrier mode with simultaneous transmission across multiple unlicensed channels in the 5 GHz band. Wi-Fi follows a hierarchical multi-carrier LBT scheme known as channel bonding.

Long Term Evolution (LTE)

FIG. 1 illustrates the basic LTE downlink physical resource 100. LTE uses Orthogonal Frequency Division Multiplexing (OFDM) in the downlink and Discrete Fourier Transform (DFT)-spread OFDM (also referred to as single-carrier FDMA (SC-FDMA)) in the uplink. The basic LTE downlink physical resource can thus be seen as a time-frequency grid, where each resource element 110 corresponds to one OFDM subcarrier 115 during one OFDM symbol interval. The uplink subframe has the same subcarrier spacing as the downlink, and the same number of SC-FDMA symbols in the time domain as OFDM symbols in the downlink.

FIG. 2 illustrates the LTE time-domain structure 200. In the time domain, LTE downlink transmissions are organized into radio frames 210 of 10 ms, each radio frame 210 consisting of ten equally-sized subframes 215 of length $T_{subframe}$=1 ms, in the illustrated example embodiment. Each subframe 215 comprises two slots of duration 0.5 ms each, and the slot numbering within a frame ranges from 0 to 19. For normal cyclic prefix, one subframe 215 consists of 14 OFDM symbols. The duration of each symbol is approximately 71.4 µs.

Furthermore, the resource allocation in LTE is typically described in terms of resource blocks (RBs), where a RB corresponds to one slot (0.5 ms) in the time domain and 12 contiguous subcarriers in the frequency domain. A pair of two adjacent RBs in time direction (1.0 ms) is known as a resource block pair. RBs are numbered in the frequency domain, starting with 0 from one end of the system bandwidth.

Downlink transmissions are dynamically scheduled. For example, in each subframe, the base station transmits control information about which terminals data is transmitted to and upon which resource blocks the data is transmitted, in the current downlink subframe. This control signaling is typically transmitted in the first 1, 2, 3, or 4 OFDM symbols in each subframe and the number n=1, 2, 3, or 4 is known as the Control Format Indicator (CFI). The downlink subframe also contains common reference symbols, which are known to the receiver and used for coherent demodulation of e.g., the control information. FIG. 3 illustrates an example downlink subframe 300 with CFI=3 OFDM symbols as control. The reference symbols shown there are the cell specific reference symbols (CRS) and are used to support multiple functions including fine time and frequency synchronization and channel estimation for certain transmission modes.

From LTE Rel-11 onwards, DL or UL resource assignments can also be scheduled on the enhanced Physical Downlink Control Channel (EPDCCH). By contrast, according to Rel-8 to Rel-10, only the Physical Downlink Control Channel (PDCCH) is available.

Physical Downlink Control Channel and Enhanced Physical Downlink Control Channel The Physical Downlink Control Channel (PDCCH) and the Enhanced Physical Downlink Control Channel (EPDCCH) may be used to carry downlink control information (DCI) such as scheduling decisions and power-control commands. For example, DCI may include:

- Downlink scheduling assignments, including Physical Downlink Shared Channel (PDSCH) resource indication, transport format, hybrid-Automatic Repeat Request (HARQ) information, and/or control information related to spatial multiplexing where applicable. A downlink scheduling assignment may also include a command for power control of the PUCCH used for transmission of HARQ acknowledgements in response to downlink scheduling assignments.
- Uplink scheduling grants, including Physical Uplink Shared Channel (PUSCH) resource indication, transport format, and HARQ-related information. An uplink scheduling grant may also include a command for power control of the PUSCH.
- Power-control commands for a set of terminals as a complement to the commands included in the scheduling assignments/grants.

One PDCCH/EPDCCH may carry one DCI message containing one of the groups of information listed above. As multiple terminals can be scheduled simultaneously, and each terminal can be scheduled on both downlink and uplink simultaneously, there must be a possibility to transmit multiple scheduling messages within each subframe. Each scheduling message may be transmitted on separate PDCCH/EPDCCH resources, and consequently there are typically multiple simultaneous PDCCH/EPDCCH transmissions within each subframe in each cell. Furthermore, to support different radio-channel conditions, link adaptation can be used, where the code rate of the PDCCH/EPDCCH is selected by adapting the resource usage for the PDCCH/EPDCCH, to match the radio-channel conditions.

Carrier Aggregation

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of carrier aggregation.

FIG. 4 illustrates aggregated bandwidth 400 by carrier aggregation (CA). CA implies that an LTE Rel-10 terminal can receive multiple CC 405A-E, where the CC have, or at least the possibility to have, the same structure as a Rel-8 carrier. A CA-capable UE is assigned a primary cell (PCell) which is always activated, and one or more secondary cells (SCells) which may be activated or deactivated dynamically.

The number of aggregated CC 405A-E as well as the bandwidth of the individual CC may be different for uplink and downlink. A symmetric configuration refers to the case where the number of CCs 405A-E in downlink and uplink is the same whereas an asymmetric configuration refers to the case that the number of CCs 405A-E is different. It is important to note that the number of CCs 405A-E configured in a cell may be different from the number of CCs 405A-E seen by a terminal. For example, a terminal may support more downlink CCs than uplink CCs, even though the cell is configured with the same number of uplink and downlink CCs.

In addition, a key feature of carrier aggregation in the ability to perform cross-carrier scheduling. This mechanism allows an EPDCCH on one CC to schedule data transmissions on another CC by means of a 3-bit Carrier Indicator Field (CIF) inserted at the beginning of the EPDCCH messages. For data transmissions on a given CC, a wireless device may expect to receive scheduling messages on the EPDCCH on just one CC—either the same CC, or a different CC via cross-carrier scheduling. The mapping from EPDCCH to PDSCH is also configured semi-statically.

Wireless Local Area Network

In typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle.

When the range of several access points (APs) using the same frequency overlap, all transmissions related to one AP might be deferred in case a transmission on the same frequency to or from another AP within range can be detected. Effectively, this means that if several APs are within range, they will have to share the channel in time, and the throughput for the individual APs may be severely degraded. FIG. 5 illustrates an example listen before talk (LBT) mechanism 500 on a single unlicensed channel.

In the single-channel LBT case, after a Wi-Fi station A transmits a data frame to a station B, station B shall transmit the ACK frame back to station A with a delay of 16 µs. Such an ACK frame is transmitted by station B without performing a LBT operation. To prevent another station interfering with such an ACK frame transmission, a station shall defer for a duration of 34 µs (referred to as DIFS) after the channel is observed to be occupied before assessing again whether the channel is occupied.

Therefore, a station that wishes to transmit first performs a CCA by sensing the medium for a fixed duration DIFS. If the medium is idle then the station assumes that it may take ownership of the medium and begin a frame exchange sequence. If the medium is busy, the station waits for the medium to go idle, defers for DIFS, and waits for a further random backoff period.

To further prevent a station from occupying the channel continuously and thereby prevent other stations from accessing the channel, it is required for a station wishing to transmit again after a transmission is completed to perform a random backoff.

For multi-carrier operation, Wi-Fi follows a hierarchical channel bonding scheme to determine its transmission bandwidth for a frame, which could be 20 MHz, 40 MHz, 80 MHz, or 160 MHz for example. In the 5 GHz band, wider Wi-Fi channel widths of 40 MHz, 80 MHz, 160 MHz or 80+80 MHz are formed by combining 20 MHz sub-channels in a non-overlapping manner. A pre-determined primary channel performs the CW-based random access procedure after a defer period if necessary, and then counts down the random number generated. The secondary channels only perform a quick CCA check for a PIFS duration (generally 25 µs) before the potential start of transmission to determine if the additional secondary channels are available for transmission. Based on the results of the secondary CCA check, transmission is performed on the larger bandwidths; otherwise transmission falls back to smaller bandwidths. The Wi-Fi primary channel is always included in all transmissions, i.e., transmission on secondary channels alone is not allowed.

Load-based Clear Channel Assessment

For a device not utilizing the Wi-Fi protocol, Europe Regulation EN 301.893, v. 1.7.1 provides the certain requirements and minimum behavior for the load-based clear channel assessment. FIG. 6 illustrates an example LBT mechanism 600 in conformance with EN 301.893. The requirements and minimum behavior are as follows:

1. Before a transmission or a burst of transmissions 604 on an operating channel, the equipment shall perform a Clear Channel Assessment (CCA) 602 check by detecting the energy level of the operating channel. The equipment shall observe the operating channel(s) for the duration of the CCA observation time 606, which is set by the manufacturer and shall be not less than 20 µs. The Operating Channel shall be considered occupied if the energy level in the channel exceeds the threshold corresponding to the power level given in enumerated point #5 below. If the equipment finds the channel to be clear, it may send transmissions 604 immediately (see point #3 below).

2. If during CCA check 602, the equipment finds an Operating Channel occupied, it shall not transmit in that channel. The equipment shall perform an Extended CCA check 608 in which the Operating Channel is observed for the duration of a random factor N multiplied by the CCA observation time. N defines the number of clear idle slots 610 resulting in a total Idle Period that needs to be observed before initiation of the transmission. The value of N shall be randomly selected in the range 1 . . . q every time an Extended CCA 608 is required and the value stored in a counter. The value of q is selected by the manufacturer in the range 4 . . . 32. This selected value shall be declared by the manufacturer (see clause 5.3.1 q)). The counter is decremented every time a CCA slot is considered to be "unoccupied". When the counter reaches zero, the equipment may transmit 612.

It should be noted that the equipment is allowed to continue Short Control Signaling Transmissions on this channel providing it complies with the requirements in clause 4.9.2.3.

For equipment having simultaneous transmissions on multiple (adjacent or non-adjacent) operating channels, the equipment is allowed to continue transmissions on other operating channels providing the CCA check did not detect any signals on those channels.

3. The total time that an equipment makes use of an operating channel is the maximum channel occupancy time 614 which shall be less than (13/32)×q ms, with q as defined in point #2 above. After the maximum channel occupancy time 614, the device shall perform the extended CCA 608 described in point #2 above.

4. Upon correct reception of a packet which was intended for the equipment, the equipment may skip CCA and immediately proceed with the transmission of management and control frames (e.g. ACK and Block ACK frames). A consecutive sequence of transmissions by the equipment, without it performing a new CCA, shall not exceed the maximum channel occupancy time as defined in point #3 above.

For the purpose of multi-cast, the ACK transmissions (associated with the same data packet) of the individual devices are allowed to take place in a sequence.

5. The energy detection threshold for the CCA shall be proportional to the maximum transmit power (PH) of the transmitter: for a 23 dBm e.i.r.p. transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 dBi receive antenna and PH specified in dBm e.i.r.p.).

Licensed-assisted access (LAA) to unlicensed spectrum using LTE

Up to now, the spectrum used by LTE has been dedicated to LTE. This has the advantage that the LTE system does not need to care about the coexistence issue and the spectrum efficiency can be maximized. However, the spectrum allocated to LTE is limited, and the allocated spectrum cannot meet the ever increasing demand for larger throughput from applications and/or services. Therefore, a new work item has been initiated in 3GPP on extending LTE to exploit unlicensed spectrum in addition to licensed spectrum.

FIG. 7 illustrates licensed-assisted access (LAA) to unlicensed spectrum using LTE carrier aggregation. As depicted, a wireless device 710 is connected to a primary cell (PCell) 712 in the licensed band and one or more secondary cells (SCells) 714 in the unlicensed ban. Herein, a secondary cell in unlicensed spectrum may be referred to as a LAA secondary cell (LAA SCell). The LAA SCell may operate in downlink only mode or operate with both UL and DL traffic. Furthermore, certain embodiments may include LTE nodes operating in standalone mode in license-exempt channels without assistance from a licensed cell. Unlicensed spectrum can, by definition, be simultaneously used by multiple different technologies. Therefore, LTE needs to consider the coexistence issue with other systems such as IEEE 802.11 (Wi-Fi).

For LAA, the backoff counter does not have to be decremented when a slot is sensed to be idle during the extended clear channel assessment (ECCA) procedure. Additionally, any subframe can be used for either DL or UL transmission.

To coexist fairly with the Wi-Fi system, transmission on the SCell must conform to LBT protocols in order to avoid collisions and causing interference to on-going transmissions. This includes both performing LBT before commencing transmissions, limiting the maximum duration of a single transmission burst, and limiting transmit power. The maximum transmission burst duration is specified by country and region-specific relations, e.g., 4 ms in Japan and 13 ms according to EN 301.893.

FIG. 8 illustrates LAA to the unlicensed spectrum with LBT and UL and DL transmissions within a transmission opportunity (TXOP). Specifically, in the example depicted, a 4 ms LAA TXOP 802 after successful LBT 804 consists of a DL transmission burst 806 with two subframes followed by an UL transmission burst 808 of two subframes. Thus, there is TXOP sharing between the downlink and the uplink. The UL burst 808 may perform a single CCA, a short extended CCA, or no CCA before transmission.

Multi-Carrier Operation

The use of LTE CA, introduced since Rel-10, offers means to increase the peak data rate, system capacity and user experience by aggregating radio resources from multiple carriers that may reside in the same band or different band.

In Rel-13, LAA has attracted a lot of interest in extending the LTE CA feature towards capturing the spectrum opportunities of unlicensed spectrum in the 5 GHz band. WLAN operating in the 5 GHz band already supports 80 MHz in the field and 160 GHz is to follow in a second wave deployment of IEEE 802.11ac. Enabling the utilization of multi-carrier operation on unlicensed carrier using LAA is deemed necessary as further CA enhancements. The extension of the CA framework beyond five carriers has been started in LTE Rel-13. The objective is to support up to 32 carriers in both UL and DL.

For LAA, the eNB is allowed to transmit DL data burst(s) on the carriers that have completed ECCA with potential self-deferral (including idle sensing for a single interval) to align transmission over multiple carriers. A point under further study in LAA is that if the network node can receive on a carrier while transmitting on another carrier, backoff counters for the carriers not transmitting while other carriers are transmitting may be frozen if the carriers are within X MHz of each other. However, the value of X has yet to be determined.

LTE systems currently allow licensed carriers to be aggregated and utilized for data transmission to boost the throughput. Due to the introduction of LAA in 3GPP Rel-13, there is a need to support multi-carrier operation on unlicensed carriers. Hence, the LBT design should be carefully considered for multi-carrier operation.

One existing solution is that the network node does LBT for each carrier on unlicensed spectrum in order to access the channel. If the LBT succeeds on one carrier, the network node transmits on this carrier. Furthermore it is generally not possible to transmit on one LAA carrier and simultaneously receive or sense the channel on adjacent carriers due to adjacent channel interference. For example, consider a LAA TXOP consisting of a DL transmission burst followed by an UL transmission burst, i.e., TXOP sharing between DL and UL. FIG. 9 illustrates two LAA SCells 902A-B wherein an UL burst 904 is interfered by a DL burst 906 on an adjacent carrier with autonomous sensing.

If each carrier such as LAA SCell 902B performs autonomous sensing such as energy detection and defers LBT 908 while an adjacent carrier is transmitting on the DL, a carrier may resume LBT 910 and start transmitting during the UL portion 904 of the adjacent carrier's TXOP due to the lack of adjacent channel leakage energy. This UL portion 904 will then not be decodable due to the sudden DL transmission 906 of the adjacent carrier, leading to an inefficient use of the unlicensed spectrum.

SUMMARY

To address the foregoing problems with existing solutions, disclosed is systems and methods for self-deferral with downlink and uplink transmission opportunity sharing.

According to certain embodiments, a method for self-deferring transmissions in a multi-carrier network is implemented in a network node. The method includes determining, by a first controller seeking to initiate a carrier sensing procedure in a first cell, that a second cell associated with a second controller has initiated a first transmission opportunity on an adjacent carrier. The first controller determines a first transmission opportunity duration associated with the first transmission opportunity initiated in the second cell. The first transmission opportunity duration includes an uplink portion and a downlink portion for transmission in the second cell. The first controller defers the carrier sensing procedure to be performed in the first cell by the first transmission opportunity duration. The carrier sensing procedure in the first cell is performed after the first transmission opportunity duration expires.

According to certain embodiments, a network node for self-deferring transmissions in a multi-carrier network includes a memory for storing data and a first controller seeking to initiate a carrier sensing procedure in a first cell. The first controller determines that a second cell associated with a second controller has initiated a first transmission opportunity on an adjacent carrier. The first controller determines a first transmission opportunity duration associated with the first transmission opportunity. The first transmission opportunity duration includes an uplink portion and a downlink portion for transmission in the second cell. The first controller defers the carrier sensing procedure to be performed in the first cell by the first transmission opportunity duration. The first controller performs the carrier sensing procedure in the first cell after the first transmission opportunity duration expires.

According to certain embodiments, a method for deferring transmissions in a multi-carrier network is implemented in a wireless device. The method includes initiating, by the wireless device, a carrier sensing procedure in a first cell. A first notification is received from a network node that a first transmission opportunity has been initiated on an adjacent carrier in a second cell. The carrier sensing procedure is deferred in the first cell by a first transmission opportunity duration associated with the first transmission opportunity initiated in the second cell. The first transmission opportunity duration includes an uplink portion and a downlink portion for transmission in the second cell. The wireless device performs the carrier sensing procedure in the first cell after the first transmission opportunity duration expires.

According to certain embodiments, a wireless device for deferring transmissions in a first cell in a multi-carrier network includes a transceiver for receiving signals from a network node and a processor in communication with the transceiver. The processor receives a first notification from the network node that a first transmission opportunity has been initiated on an adjacent carrier in a second cell. A carrier sensing procedure is deferred in the first cell for a first transmission opportunity duration associated with the first transmission opportunity initiated in the second cell. The first transmission opportunity duration includes an uplink portion and a downlink portion for transmission in the second cell. The carrier sensing procedure is performed in the first cell after the first transmission opportunity duration expires.

Certain embodiments of the present disclosure may provide one or more technical advantages. For example, certain embodiments facilitate the utilization of multi-carrier operation on unlicensed carriers. As another example, certain embodiments may avoid interference from downlink bursts on one licensed assisted access secondary cell to uplink bursts within the transmission opportunity of an adjacent secondary cell. Another technical advantage may be improved coexistence between LAA/LTE-U and Wi-Fi. Still another technical advantage may be the facilitation of multi-carrier operation in standalone LTE-U networks.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

According to certain embodiments, a new listen before talk (LBT) self-deferral logical controller is introduced at the network node. A transmission opportunity aware self-deferral procedure may be used for multicarrier LBT scenarios. For example, if a licensed assisted access secondary cell (LAA SCell) is deferring its LBT process to let another carrier finish its transmission opportunity, then the deferral period may include the entire planned transmission opportunity duration, including both the downlink (DL) and uplink (UL) burst durations. If multiple adjacent secondary cells (SCells) have commenced their transmission opportunities (TXOPs), then remaining carriers may take into account the longest such planned TXOP with DL/UL sharing. If the UL burst portion of a TXOP is cancelled due to failed LBT, this may be communicated to adjacent carriers who may then resume their LBT processes. For purposes of this disclosure, adjacent carriers may refer to both those carrier that are either immediately or directly adjacent and those carrier that are within close enough proximity to experience adjacent channel leakage energy which may result in undecodable transmissions.

Example applications of the proposed TXOP-aware self-deferral are described for two main categories of multicarrier LBT. The first category of applications include multiple random backoff channels (MRBC) wherein a network node performs LBT on each carrier with either the same random number or different random numbers. The network node then transmits on the corresponding carriers where LBT succeeds after following the post-backoff wait time. The second category of applications include a single random backoff channel (SRBC) wherein the node performs LBT with full-fledged random backoff on one of the multiple carriers. A short period before the intended transmit time, the network node may do a quick CCA check on other carriers. The network node may then transmit on the random back off channel plus a subset of the other carriers that are revealed to be free by the quick CCA check.

Figure 1:
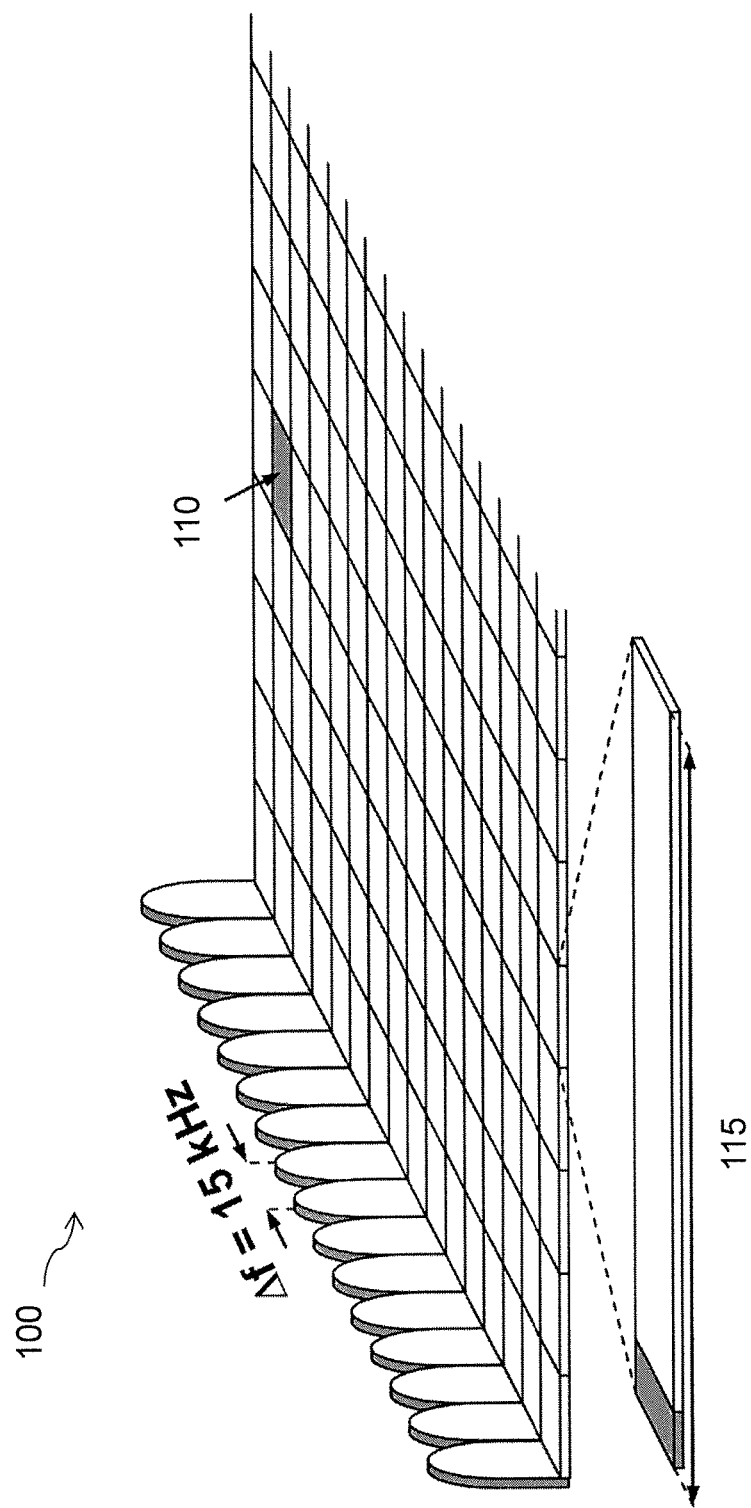
FIG. 1 illustrates the basic LTE downlink physical resource, according to certain embodiments.
Figure 2:
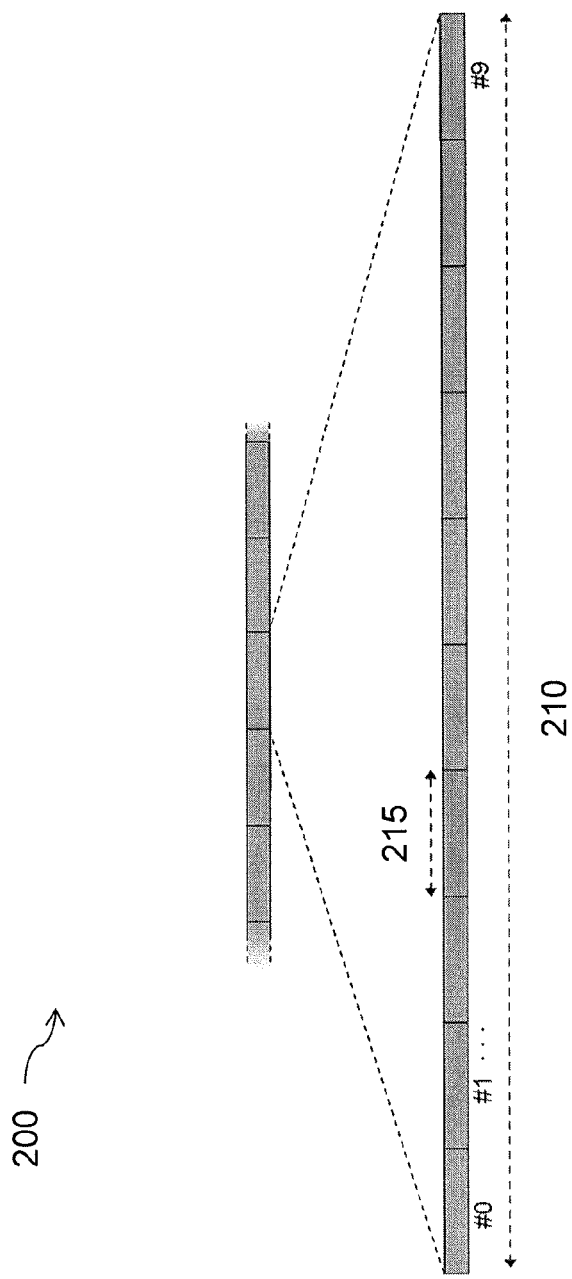
FIG. 2 illustrates the LTE time-domain structure, according to certain embodiments.
Figure 3:
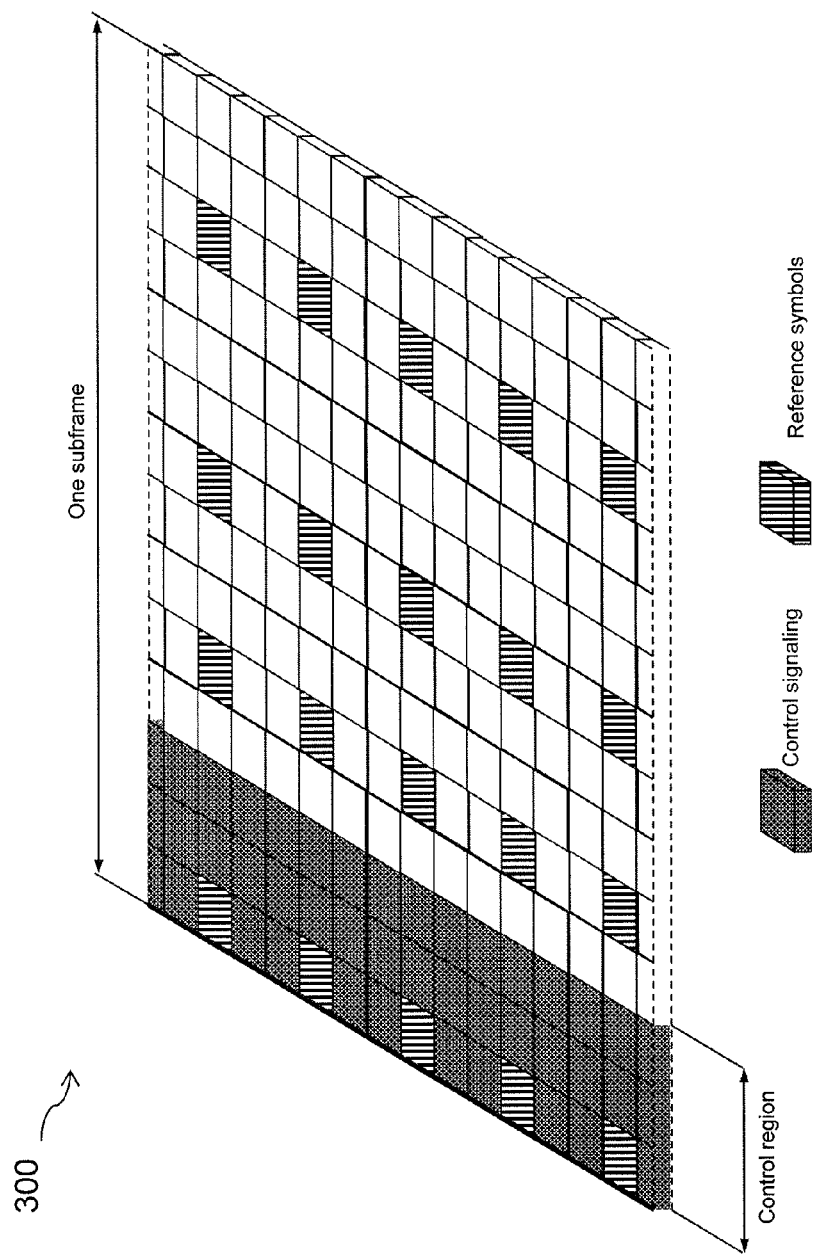
FIG. 3 illustrates an example downlink subframe, according to certain embodiments.
Figure 4:
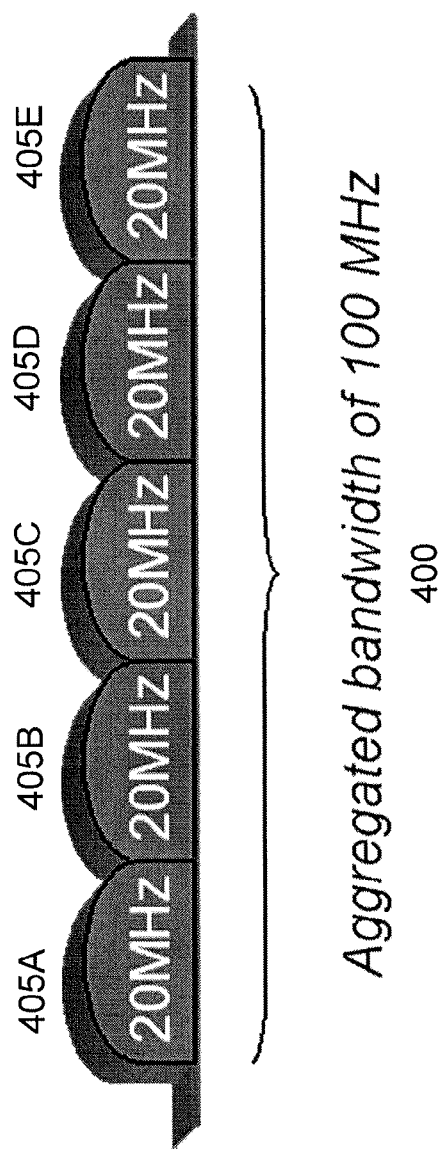
FIG. 4 illustrates aggregated bandwidth by carrier aggregation, according to certain embodiments.
Figure 5:
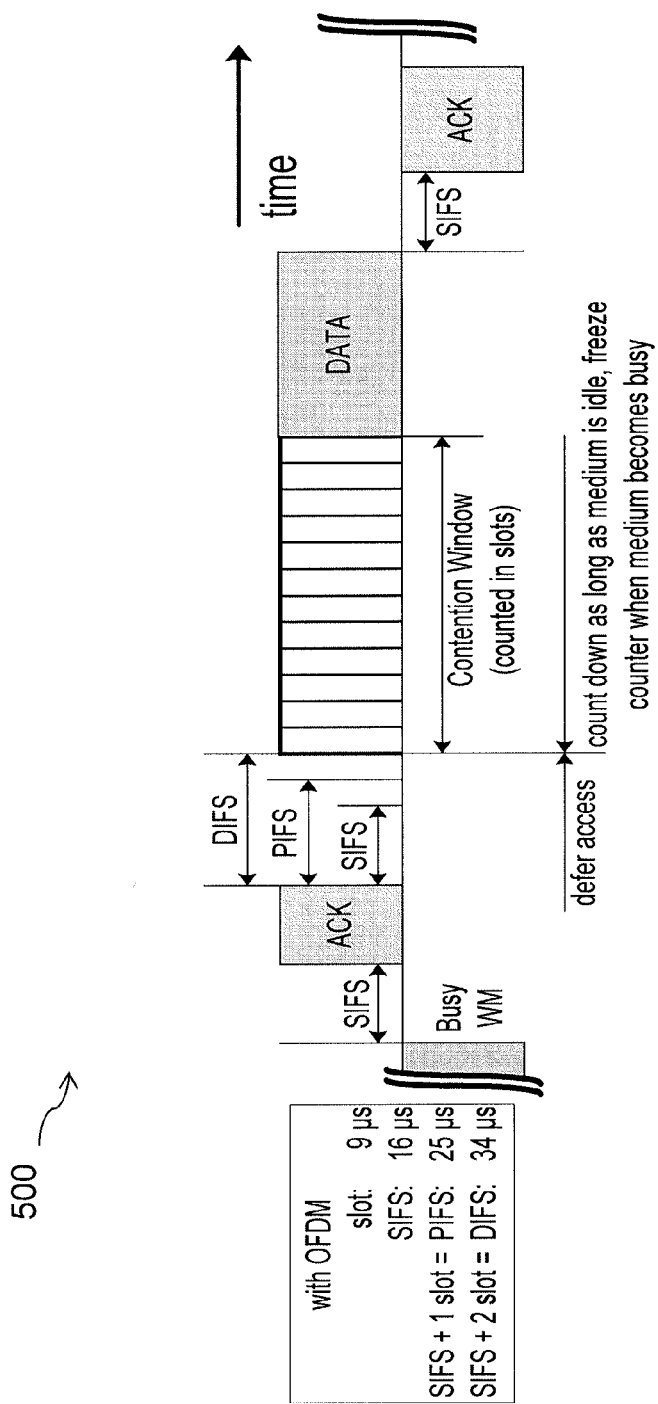
FIG. 5 illustrates an example listen before talk (LBT) mechanism on a single unlicensed channel, according to certain embodiments.
Figure 6:
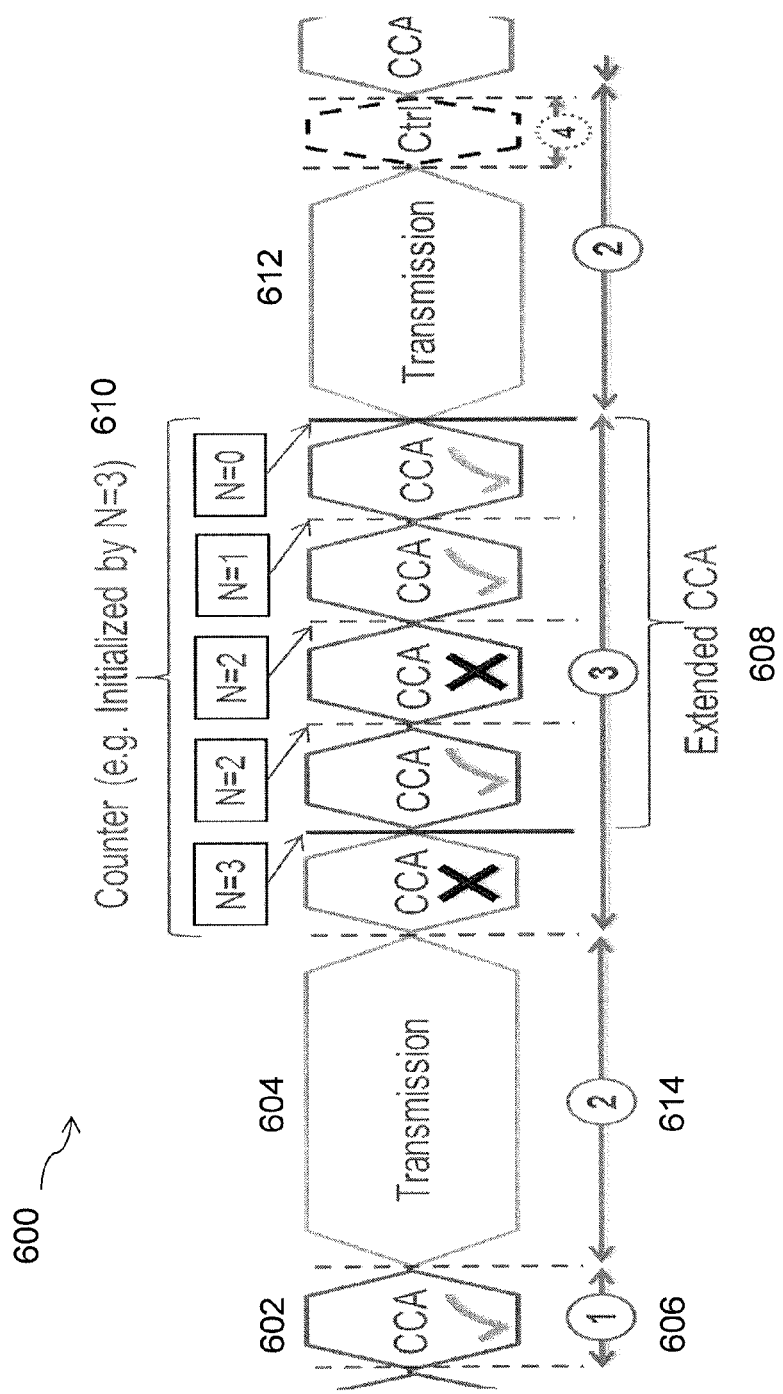
FIG. 6 illustrates another example LBT mechanism, according to certain embodiments.
Figure 7:
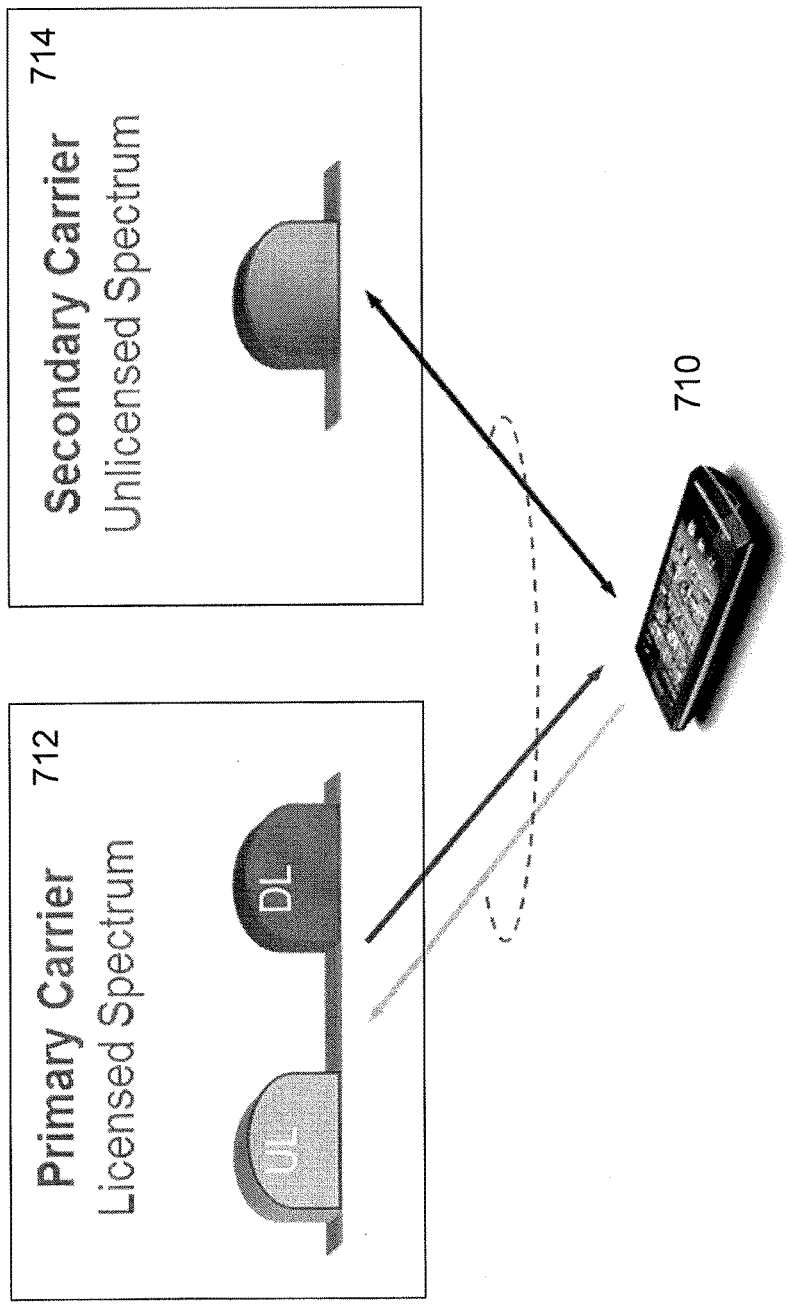
FIG. 7 illustrates licensed-assisted access (LAA) to unlicensed spectrum using LTE carrier aggregation, according to certain embodiments.
Figure 8:
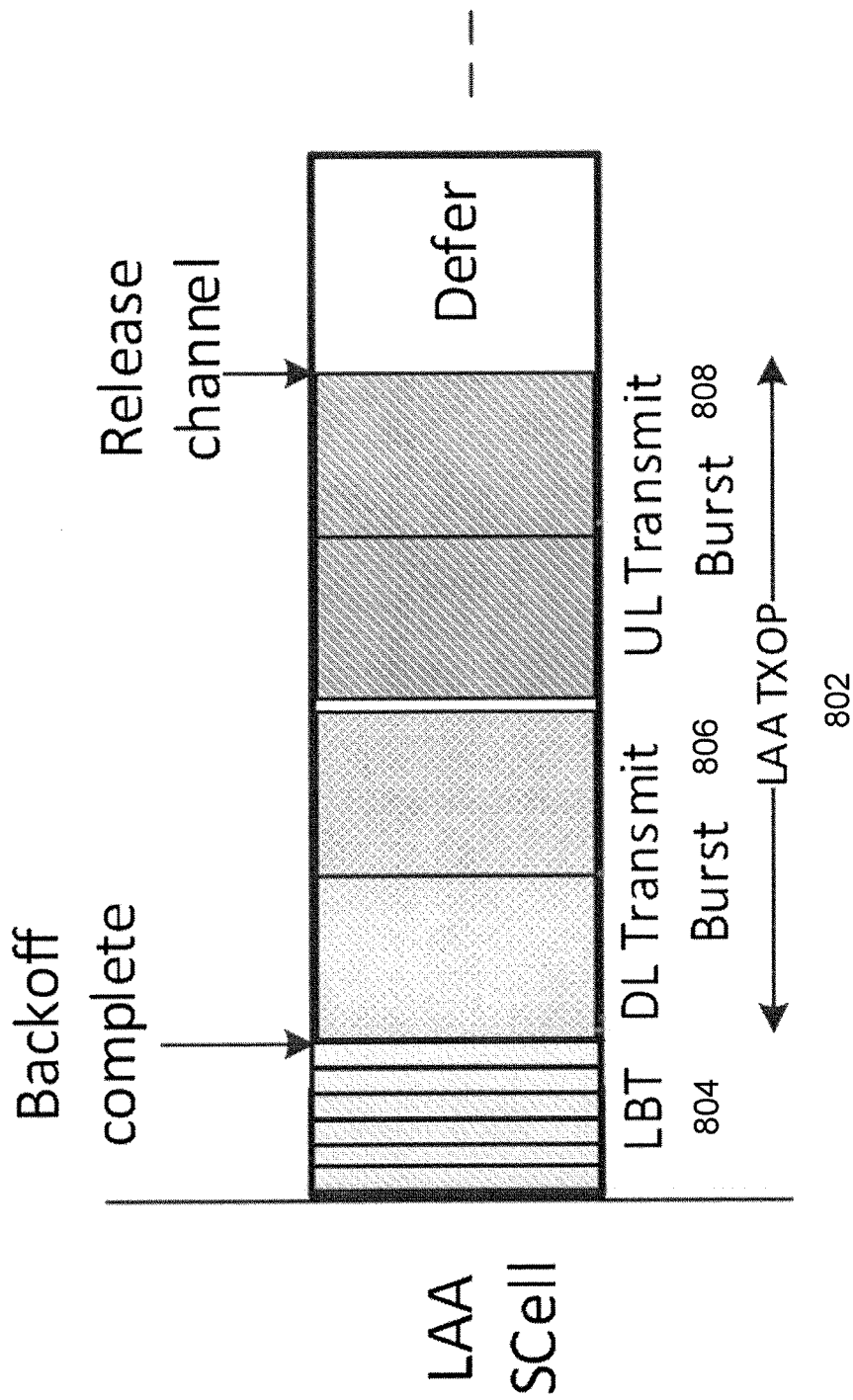
FIG. 8 illustrates LAA to the unlicensed spectrum with LBT and uplink and downlink transmissions within a transmission opportunity, according to certain embodiments.
Figure 9:
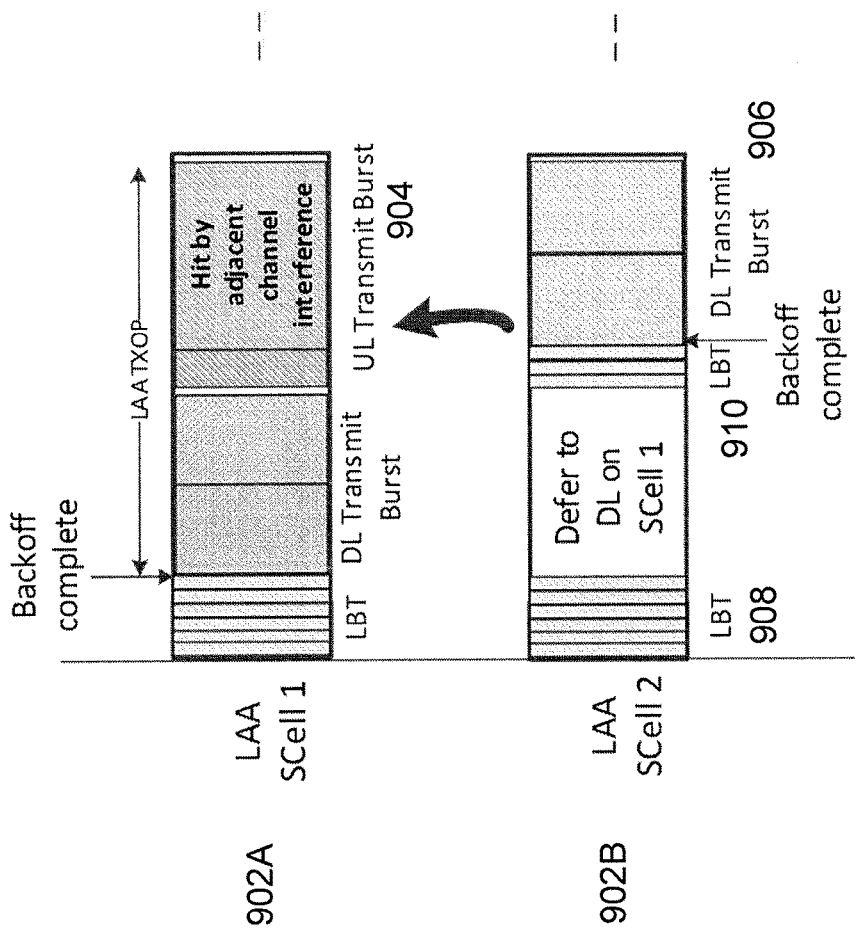
FIG. 9 illustrates two LAA secondary cells wherein an uplink burst is interfered by a downlink burst on an adjacent carrier with autonomous sensing, according to certain embodiments.
Figure 10:
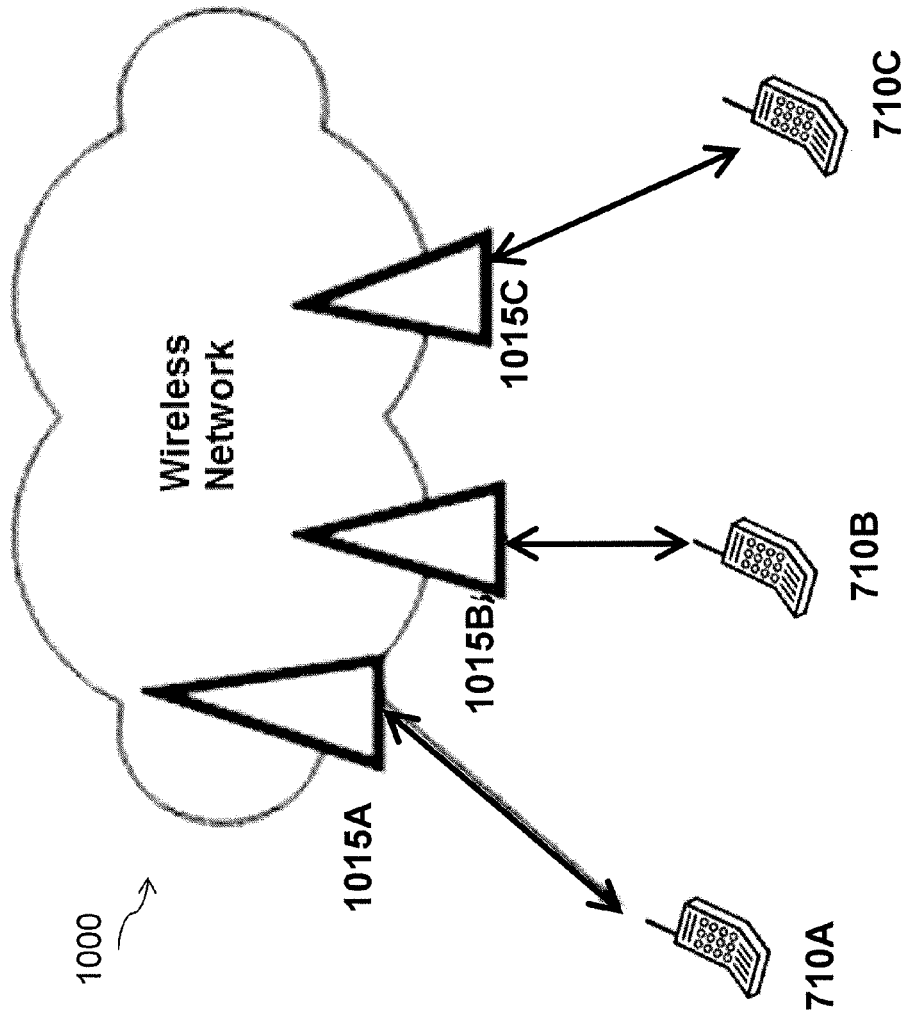
FIG. 10 illustrates an embodiment of a network that may implement LBT self-deferral, in accordance with certain embodiments.

FIG. 10 is a block diagram illustrating an embodiment of a network 1000 that may implement LBT self-deferral, in accordance with certain embodiments. Network 1000 includes one or more wireless devices 710A-C, which may be interchangeably referred to as wireless devices 710 or UEs 710, and network nodes 1015A-C, which may be interchangeably referred to as network nodes 1015 or eNodeBs 1015. A wireless device 710 may communicate with network nodes 1015 over a wireless interface. For example, wireless device 710A may transmit wireless signals to one or more of network nodes 1015, and/or receive wireless signals from one or more of network nodes 1015. The wireless signals may contain voice traffic, data traffic, control signals, and/or any other suitable information. In some embodiments, an area of wireless signal coverage associated with a network node 1015 may be referred to as a cell. In some embodiments, wireless devices 710 may have D2D capability. Thus, wireless devices 710 may be able to receive signals from and/or transmit signals directly to another wireless device 710. For example, wireless device 710A may be able to receive signals from and/or transmit signals to wireless device 710B.

In certain embodiments, network nodes 1015 may interface with a radio network controller (not depicted). The radio network controller may control network nodes 1015 and may provide certain radio resource management functions, mobility management functions, and/or other suitable functions. In certain embodiments, the functions of the radio network controller may be included in network node 1015. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 710. Wireless devices 710 may exchange certain signals with the core network node using the non-access stratum layer. In non-access stratum signaling, signals between wireless devices 710 and the core network node may be transparently passed through the radio access network. In certain embodiments, network nodes 1015 may interface with one or more network nodes over an internode interface. For example, network nodes 1015A and 1015B may interface over an X2 interface.

As described above, example embodiments of network 1000 may include one or more wireless devices 710, and one or more different types of network nodes capable of communicating (directly or indirectly) with wireless devices 710. Wireless device 710 may refer to any type of wireless device communicating with a node and/or with another wireless device in a cellular or mobile communication system. Examples of wireless device 710 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 710 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. The terminology such as network node and UE should be considering non-limiting and does in particular not imply a certain hierarchical relation between the two; in general "eNodeB" could be considered as device 1 and "UE" device 2, and these two devices communicate with each other over some radio channel. Example embodiments of network nodes 1015, wireless devices or UEs 710, and other network nodes (such as radio network controller or core network node) are described in more detail with respect to FIGS. 13, 16, and 19, respectively.

Although FIG. 10 illustrates a particular arrangement of network 1000, the present disclosure contemplates that the various embodiments described herein may be applied to a variety of networks having any suitable configuration. For example, network 1000 may include any suitable number of wireless devices 710 and network nodes 1015, as well as any additional elements suitable to support communication between UEs or between a UE and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the UE receives and/or transmits signals (e.g., data). For example, the various embodiments described herein may be applicable to LTE, LTE-Advanced, LTE-U UMTS, HSPA, GSM, cdma2000, WiMax, WiFi, 5G, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The TXOP-aware self-deferral techniques described herein are applicable to both LAA LTE and standalone LTE operation in license-exempt channels. However, whether or not the spectrum is licensed is not determinative. In a particular embodiment, the license-exempt spectrum could be licensed for a special use and rented for LAA use. The described techniques are generally applicable for transmissions from both network nodes 1015 and wireless devices 710. Likewise, the techniques are applicable to both frequency-division duplex (FDD) and time-division duplex (TDD) systems.

Figure 11:
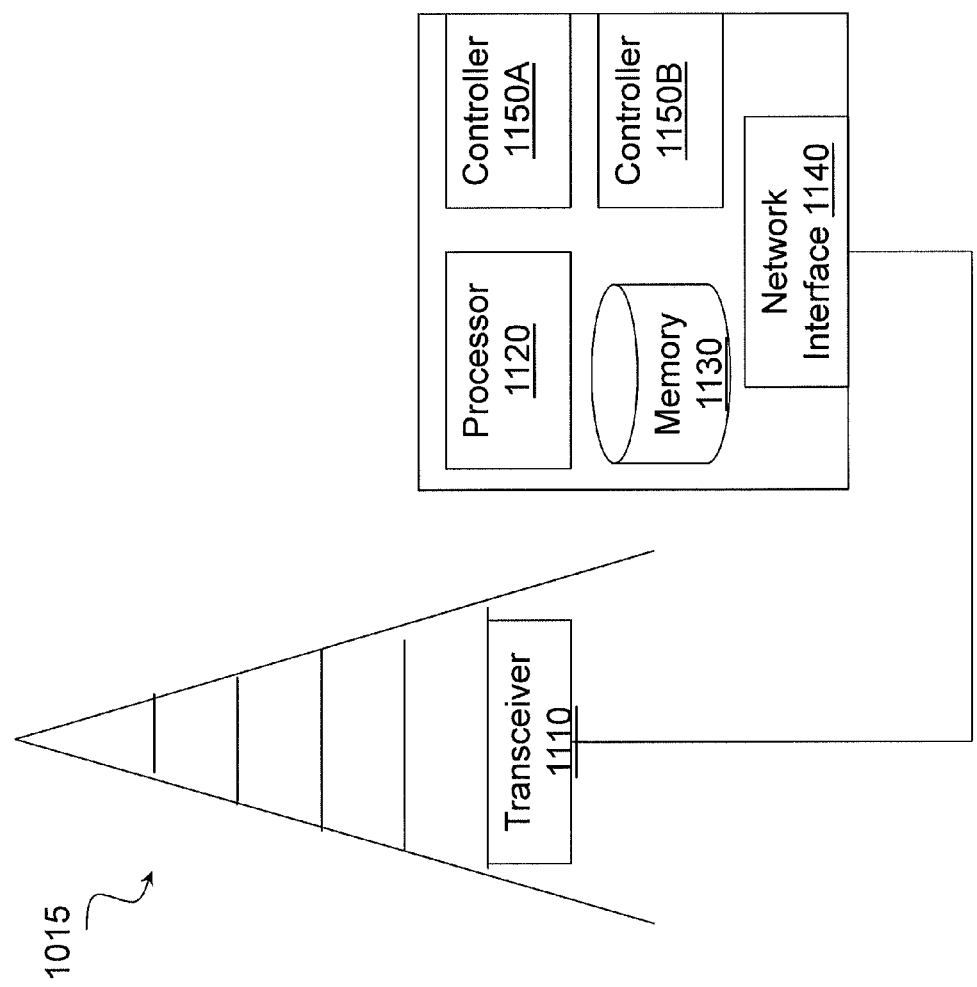
FIG. 11 illustrates an exemplary network node for self-deferring LBT transmissions in a multi-carrier network, in accordance with certain embodiments.

FIG. 11 is a block schematic of an exemplary network node 1015, in accordance with certain embodiments. Network node 1015 may be any type of radio network node or any network node that communicates with a UE and/or with another network node. Network nodes 1015 may be deployed throughout network 1000 as a homogenous deployment, heterogeneous deployment, or mixed deployment. A homogeneous deployment may generally describe a deployment made up of the same (or similar) type of network nodes 1015 and/or similar coverage and cell sizes and inter-site distances. A heterogeneous deployment may generally describe deployments using a variety of types of network nodes 1015 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 1015 may include one or more of transceiver 1110, processor 1120, memory 1130, and network interface 1140. In some embodiments, transceiver 1110 facilitates transmitting wireless signals to and receiving wireless signals from wireless device 710 (e.g., via an antenna), processor 1120 executes instructions to provide some or all of the functionality described above as being provided by a network node 1015, memory 1130 stores the instructions executed by processor 1120, and network interface 1140 communicates signals to backend network components, such as a gateway, switch, router, Internet, Public Switched Telephone Network (PSTN), core network nodes or radio network controllers, etc.

In certain embodiments, network node 1015 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processor 1120 may include any suitable combination of hardware and software implemented in one or more modules to execute instructions and manipulate data to perform some or all of the described functions of network node 1015. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processor 1120 and may refer to any suitable device operable to receive input for network node 1015, send output from network node 1015, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

In certain embodiments, one or more controllers 1150A-B are introduced at network node 1015. Controllers 1150A-B may comprise self-deferral logic controllers that are each associated with a carrier cell. Accordingly, though network node 1015 is depicted as including only two controllers 1150A-B, it is recognized that network node 1015 may include any appropriate number of controllers. In still other embodiments, a single controller 1050 may be incorporated into network node 1015 and operate to control multiple carriers.

In a particular embodiment, controllers 1150A-B take into account the planned TXOP durations of active SCells within network node 1015 and coordinate the self-deferral periods of SCells which are not transmitting or receiving. If multiple adjacent SCells have commenced their TXOPs, then remaining carriers take into account the longest such planned TXOP with DL/UL sharing. Controllers 1150A-B may also configure the self-deferral duration on SCells that have finished ECCA and are about to transmit. The SCells may be co-located at the same physical transmission point (i.e., network node 1015) or may be non-co-located at different physical transmission points (i.e., network nodes 1015).

In a particular embodiment, if the UL burst portion starting from subframe n of a TXOP is cancelled due to failed LBT at wireless device 710, a first controller 1150A may indicate to other controllers 1150B associated with adjacent carriers that the adjacent carriers may resume their LBT processes without waiting for the entire planned TXOP duration, for example, resume LBT from subframe n+1. Alternatively, if the UL burst portion starting from subframe n of a TXOP is cancelled due to a failed LBT at wireless device 710 but wireless device 710 was also granted UL transmission at n+1, wireless device 710 may attempt to do another LBT at n+1. If the LBT succeeds, then wireless device 710 may transmit on the UL at n+1. Thus, failing at subframe n does not mean that all of the UL portion of the TXOP is cancelled if the wireless device 710 has further grants for transmission.

In another particular embodiment, controllers 1150A-B may configure the deferral durations based on TXOP durations of wireless devices 710 belonging to other technologies. As a non-limiting example, controllers 1150A-B take into account decoded Wi-Fi preambles and Wi-Fi NAV information to determine self-deferral durations for better coexistence.

In another particular embodiment, controllers 1150A-B may configure the deferral durations based on TXOP durations and timings of nodes of the same technology that belong to another cell or another network. As a non-limiting example, controllers 1150A-B take into account the TXOP configurations of a neighboring LAA network node and increase frequency reuse by scheduling the DL TXOP portion of one or more of its own SCells to coincide with the DL TXOP portions of the neighbor LAA carriers at the network node 1015.

In certain embodiments, controllers 1150A-B may transmit deferral requests over the air with requested LBT self-deferral duration to be followed by neighboring nodes of the same or another technology. As a non-limiting example, if controller 1150A is about to commence an UL-heavy TXOP, controller 1150A may indicate how long neighboring LAA controllers 1150B should defer their DL LBT, so as to avoid DL-to-UL collisions from neighboring LAA controllers.

Other embodiments of network node 1015 may include additional components beyond those shown in FIG. 11 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

Figure 12:
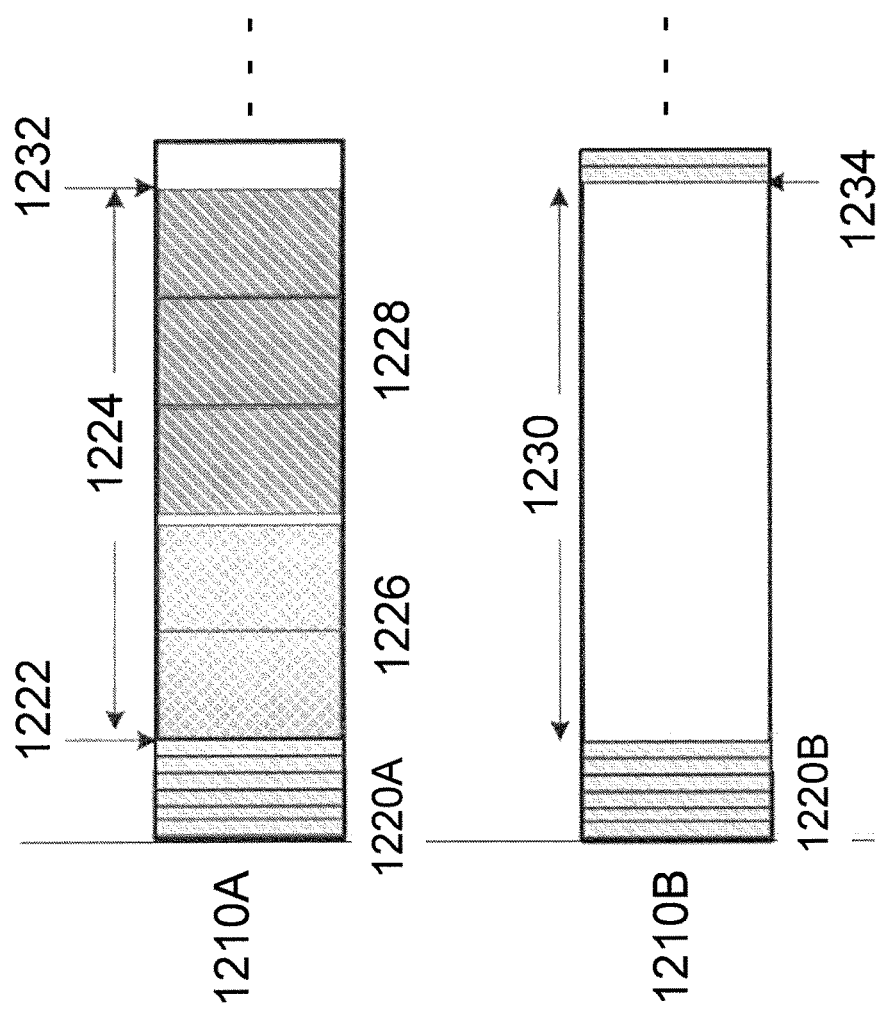
FIG. 12 illustrates an exemplary TXOP-aware LBT self-deferral configuration for MRBC scenarios, in accordance with certain embodiments.

FIG. 12 illustrates an exemplary TXOP-aware LBT self-deferral configuration for MRBC scenarios, in accordance with certain embodiments. Specifically, FIG. 12 illustrates a first LAA SCell 1210A and a second LAA SCell 1210B. Each LAA SCell 1210A-B is associated with a controller 1150A-B, respectively, that operate according to the respective controllers 1150A-B own associated random backoff cycle. In other words, each controller 1150 A-B associated with SCells 1210A-B individually perform CCA checks (in slots) in order to decrement its associated random backoff counter. The controllers 1150A-B associated with SCells 1210A-B may have independent backoff counters or may be jointly assigned a common backoff counter, in particular embodiments.

As depicted in FIG. 12, a first controller 1150A may perform a first carrier sensing procedure 1220A in a first SCell 1210A. Similarly, a second controller 1150B may perform a second carrier sensing procedure 1220B in a second SCell 1210B. Again, the terms first and second are provided for example purposes only and may be interchanged.

In a particular embodiment, the first carrier sensing procedure 1220A includes an LBT with random back off procedure and the second carrier sensing procedure 1220B includes a second LBT with random back off procedure. In the depicted example, first SCell 1210A is the first to finish its carrier sensing procedure 1220A at point 1222. Accordingly, first controller 1150A associated with first SCell 1210A begins a TXOP 1224 at point 1222. In the depicted example, TXOP 1224 includes two DL subframes 1226 followed by three UL subframes 1228. First SCell 1210A may begin the TXOP 1224 immediately after point 1222, in a particular embodiment. Alternatively, first Scell 1210A may optionally wait for one or more CCA slots before transmitting in TXOP 1224.

As depicted in FIG. 12, second SCell 1210B defers for the entire length of TXOP 1224 on first SCell 1210A. Thus, first controller 1150A may configure self-deferral duration 1230 on second SCell 1210B to allow UL reception on first SCell 1210A without adjacent channel interference from SCell 1210B. At the conclusion of TXOP 1224, first SCell 1210A releases the channel at point 1232 and second SCell 1210B may resume its LBT with backoff procedure 1220B at point 1234.

Figure 13:
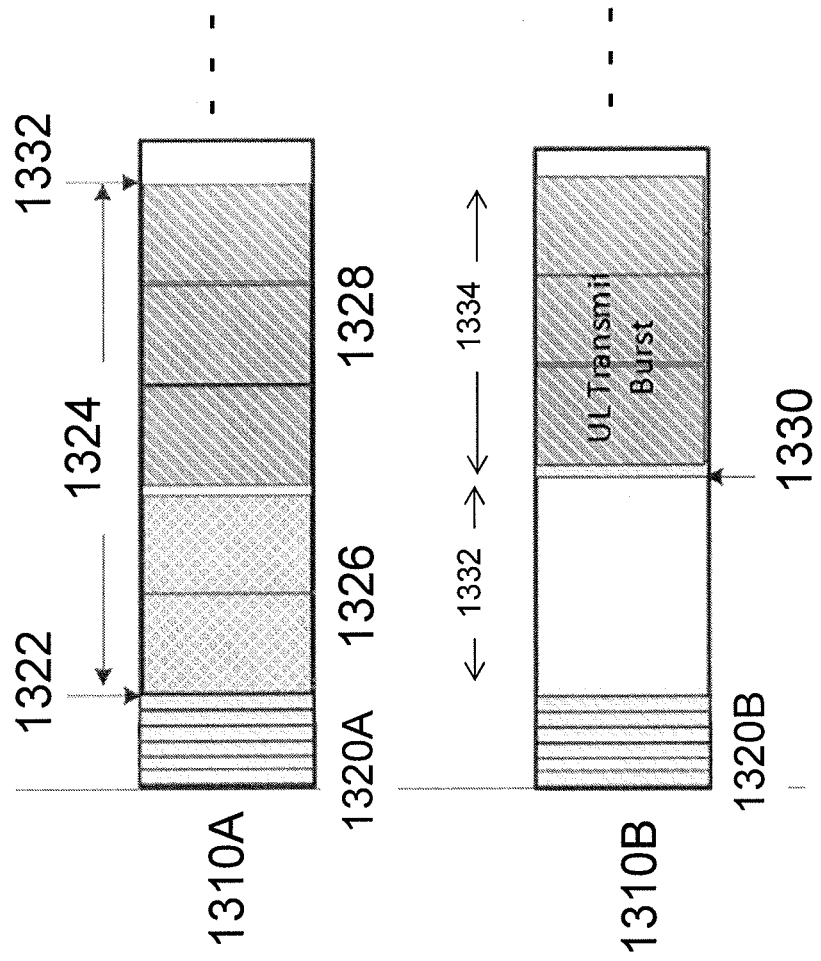
FIG. 13 illustrates an alternative exemplary TXOP-aware LBT self-deferral configuration for MRBC scenarios, in accordance with certain embodiments.

FIG. 13 illustrates an alternative exemplary TXOP-aware LBT self-deferral configuration for MRBC scenarios, in accordance with certain embodiments. Similar to FIG. 12, a first SCell 1310A and a second SCell 1310B are depicted as performing first and second carrier sensing procedures 1320A and 1320B, respectively. Again, Additionally, the terms first and second are provided for example purposes only and may be interchanged.

As depicted, first SCell 1310A is the first to finish its carrier sensing procedure at point 1322. First SCell 1310A then initiates first transmission opportunity 1324, which includes two downlink subframes 1326 and three uplink subframes 1328. In the illustrated embodiment however, even if second SCell 1310B misses transmitting simultaneously on the DL due to unfinished LBT and backoff procedure 1320B, second SCell 1310B may be configured to perform a single CCA or short extended CCA at point 1330 before the start of the UL transmission of UL subframes 1328 on first SCell 1310A. Second SCell 1310B may be configured to start simultaneous UL transmission during the UL subframes 1328 if the channel appears to be idle, as shown in FIG. 13. Accordingly, second SCell 1310B defers only for the downlink duration 1332 and transmits on the UL during the UP duration 1334. The durations 1334 of the UL transmission bursts may coordinated by controllers 1150A-B to avoid overlapping with the next DL burst of first SCell 1310A. Additionally, the UL grants for second SCell 1310B may be sent via cross-carrier scheduling, in particular embodiments.

In still another embodiment, transmission-aware LBT self-deferral may be applied to a multi-carrier scheme with a single random backoff channel (SRBC). In such an embodiment, the carrier or SCell that is designated as the single random backoff channel with random draws of a backoff counter may be designated and may be changed dynamically prior to an intended transmission burst. Additionally, the possible contention window size may be changed dynamically prior to an intended transmit burst. The remaining carriers (i.e., SCells) that are not designated may be considered to be ancillary carriers.

In certain embodiments, the choice of the SRBC may be made based on channel interference conditions. In other embodiments, the choice of the SRBC may be made based on the presence or absence of other SRBCs in adjacent networks. As one non-limiting example, the adjacent network may be an IEEE 802.11 network with its primary channel on the same carrier as the SRBC of LAA. In the case of a wireless device 710 attempting multicarrier UL transmission, the wireless device's SRBC may be configured by the network node 1015. In another example, multiple carriers are designated as full random backoff channels, and the first SCell to complete its backoff procedure is designated as the SRBC and initiates the quick CCA check on all or some of the other channels, regardless of their backoff counter state.

On the ancillary carriers, a short CCA of fixed duration may be performed to check which of the carriers are available for transmission along with the random backoff channel. This ancillary CCA check may be performed in parallel with the end of the random backoff countdown or during the defer period on the SRBC. Thus, the ancillary CCA check may be performed when the SRBC senses the medium to be idle and is approaching a feasible transmission start time.

The self-deferral controller 1150A-B may configure self-deferral durations on either the SRBC or the ancillary channels by taking into account the overall duration of planned DL and UL bursts within a TXOP, based on the techniques described above with regard FIGS. 12 and 13.

Figure 14:
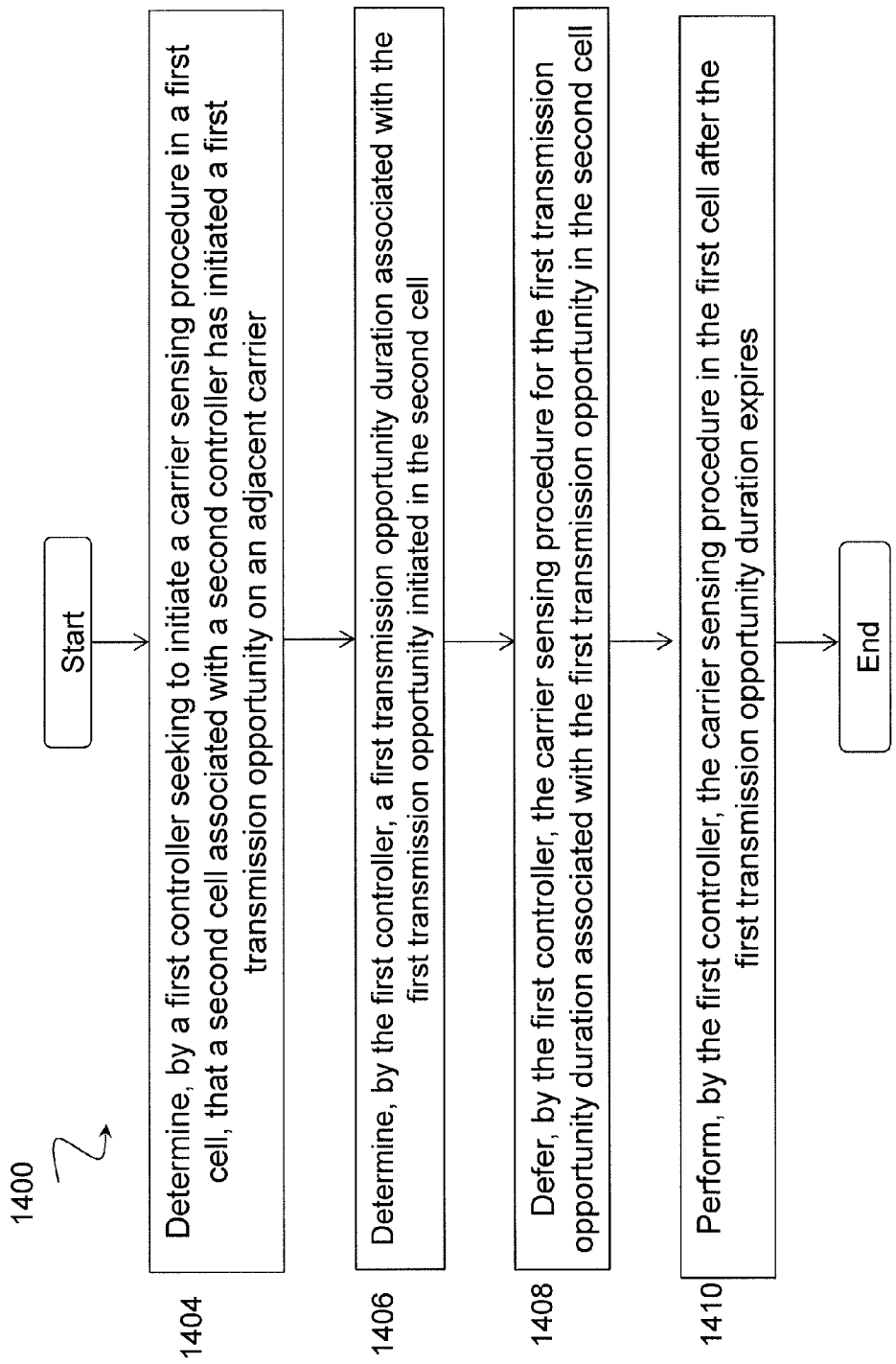
FIG. 14 illustrates an exemplary method by a network node for self-deferring LBT transmissions in a multi-carrier network, in accordance with certain embodiments.

FIG. 14 illustrates method 1400 by a network node 115 for self-deferring transmissions in a multi-carrier network, in accordance with certain embodiments. The method begins at step 1404 when a first controller 1150B seeking to initiate a carrier sensing procedure 1220B, 1320B in a first SCell 1210B, 1310B determines that a second SCell 1210A, 1310A associated with a second controller 1150A has initiated a first TXOP 1224, 1324 on an adjacent carrier. In certain embodiments, the first controller 1150B and the second controller 1150A are co-located at the same network node 1015. In certain embodiments, initiating the carrier sensing procedure may include initiating, by the first controller 1150B, a procedure for determining the duration of the sensing procedure. For example, where the first controller 1150B is starting a new procedure, first controller 1150B may begin a procedure for generating a random number for the backoff. Alternatively, where first controller 1150B is resuming a previously initiated LBT procedure, initiating the carrier sensing procedure may include determining a pending backoff number.

At step 1406, first controller 1150B determines a first TXOP duration 1230, 1332 associated with the first TXOP 1224, 1324 initiated in the second SCell 1210A, 1310A. In certain embodiments, the length of the first TXOP duration is determined based on at least one of a decoded Wi-Fi preamble, Wi-Fi NAV information associated with a second network node (1015B-C), and a TXOP configuration of a second network node, a downlink portion for transmission in the second cell coinciding with a downlink portion of a TXOP of the second network node. In other embodiments, the length of the first TXOP duration 1230, 1332 may be received from a second network node 1015B that neighbors first network node 1015A.

At step 1408, first controller 1150B defers the carrier sensing procedure 1220B, 1320B for the first TXOP duration 1230, 1332 associated with the first TXOP 1224, 1324 initiated in the second SCell 1210A, 1310A.

At step 1410, first controller 1150B then performs the carrier sensing procedure 1220B, 1320B in the first SCell 1210A, 1310A after the first TXOP duration expires 1234, 1332. In a particular embodiment, performing the carrier sensing procedure 1220B, 1320B may include resuming a carrier sensing procedure 1220B, 1320B that was previously being performed when it was determined that the second SCell 1210A, 1310A had initiated the first TXOP 1224, 1324. In a particular embodiment, first controller 1150B may determine that the first TXOP 1224, 1324 has failed or has been cancelled, and first controller 1150 may perform the carrier sensing procedure 1220B, 1320 in the first SCell 1210A, 1310A at step 1410 in response to determining that the first TXOP 1224, 1324 has failed or been cancelled.

Figure 15:
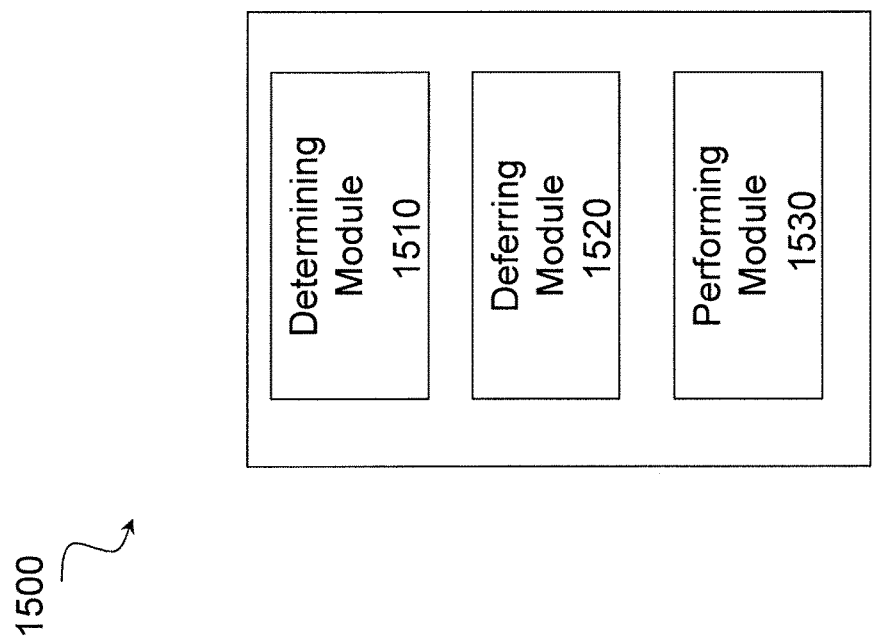
FIG. 15 illustrates an exemplary computer networking virtual apparatus for self-deferring LBT transmissions in a multi carrier network, in accordance with certain embodiments.

In certain embodiments, the method for self-deferring transmissions in a multi-carrier network as described above may be performed by a computer networking virtual apparatus. FIG. 15 illustrates an example computer networking virtual apparatus 1500 for self-deferring transmissions in a multi-carrier network, according to certain embodiments. In certain embodiments, computer networking virtual apparatus 1500 may include at least one determining module 1510, a deferring module 1520, a performing module 1530, and any other suitable modules for self-deferring transmissions in a multi-carrier network. In certain embodiments, virtual computing device 1500 may alternatively or additionally include modules for performing steps similar to those described above with regard to the method illustrated and described in FIG. 14. In some embodiments, one or more of the determining module 1510, deferring module 1520, performing module 1520, or any other suitable module may be implemented using one or more processors 1120 of FIG. 11. In certain embodiments, the functions of two or more of the various modules may be combined into a single module.

The at least one determining module 1510 may perform the determining functions of computer networking virtual apparatus 1500. For example, when seeking to initiate a carrier sensing procedure 1220B, 1320B in a first SCell 1210B, 1310B, determining module 1510 may determine that a second SCell 1210A, 1310A associated with a second controller 1150A has initiated a first TXOP 1224, 1324 on an adjacent carrier. As another example, determining module 1510 may determine a first TXOP duration 1230, 1332 associated with the first TXOP 1224, 1324 initiated in the second SCell 1210A, 1310A. In a particular embodiment, determining module 1510 may include or be included in processor 1120. The determining module may include analog and/or digital circuitry configured to perform any of the functions of the determining module and/or processor 1120. The functions of the determining module may, in certain embodiments, be performed in one or more distinct modules.

The deferring module 1520 may perform the deferring functions of computer networking virtual apparatus 1500. For example, deferring module 1520 defer the carrier sensing procedure 1220B, 1320B for the first TXOP duration 1230, 1332 associated with the first TXOP 1224, 1324 initiated in the second SCell 1210A, 1310A. In a particular embodiment, deferring module 1520 may include or be included in processor 1120. The deferring module 1520 may include analog and/or digital circuitry configured to perform any of the functions of the deferring module and/or processor 1120. The functions of deferring module 1520 may, in certain embodiments, be performed in one or more distinct modules.

The performing module 1530 may perform the performing functions of computer networking virtual apparatus 1500. For example, performing module 1530 may perform the carrier sensing procedure 1220B, 1320B in the first SCell 1210A, 1310A after the first TXOP duration expires 1234, 1332. In a particular embodiment, performing the carrier sensing procedure 1220B, 1320B may include resuming a carrier sensing procedure 1220B, 1320B that was previously being performed when it was determined that the second SCell 1210A, 1310A had initiated the first TXOP 1224, 1324. In other embodiments, performing the carrier sensing procedure 1220B, 1320B may include initiating a new carrier sensing procedure. In a particular embodiment, performing module 1530 may include or be included in processor 1120. The performing module 1530 may include analog and/or digital circuitry configured to perform any of the functions of the deferring module and/or processor 1120. The functions of performing module 1530 may, in certain embodiments, be performed in one or more distinct modules.

Other embodiments of computer networking virtual apparatus 1500 may include additional components beyond those shown in FIG. 15 that may be responsible for providing certain aspects of the radio network node's 1015 functionality, including any of the functionality described above and/or any additional functionality (including any functionality necessary to support the solutions described above). The various different types of network nodes 1015 may include components having the same physical hardware but configured (e.g., via programming) to support different radio access technologies, or may represent partly or entirely different physical components.

Figure 16:
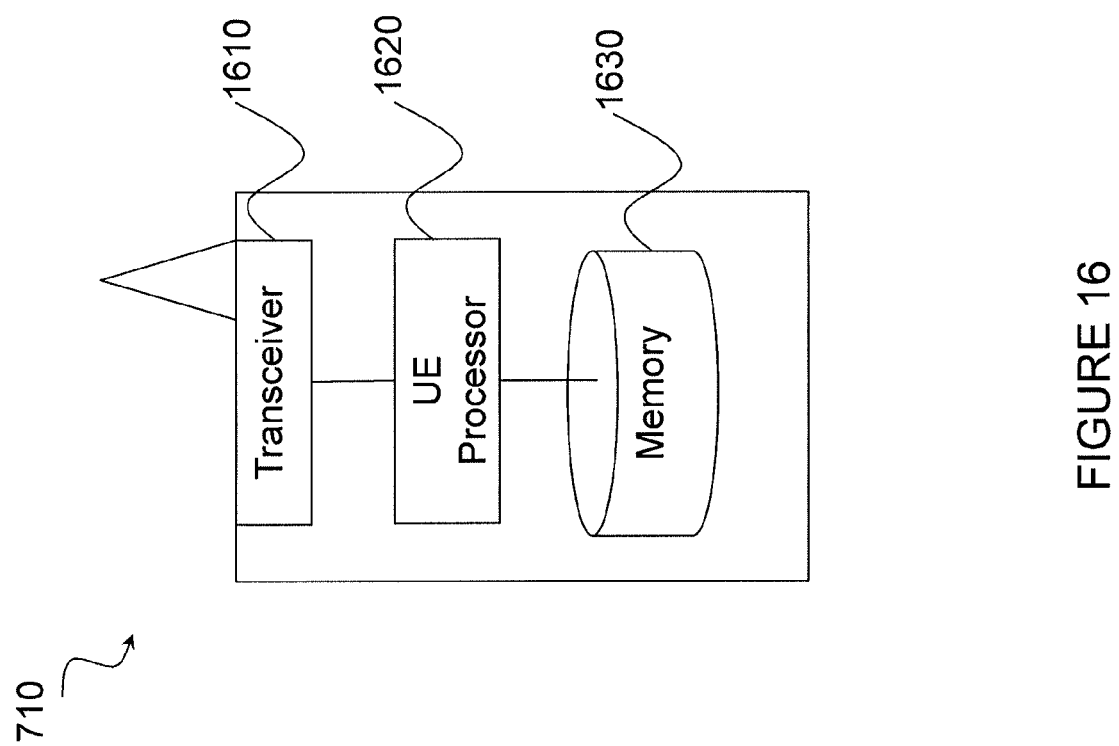
FIG. 16 illustrates an exemplary wireless device for self-deferring LBT transmissions in a multi-carrier network, in accordance with certain embodiments.

FIG. 16 is a block schematic of an exemplary wireless device 710, in accordance with certain embodiments. As depicted, wireless device 710 includes transceiver 1610, processor 1620, and memory 1630. In some embodiments, transceiver 1610 facilitates transmitting wireless signals to and receiving wireless signals from network node 1015 (e.g., via an antenna), processor 1620 executes instructions to provide some or all of the functionality described above as being provided by wireless device 710, and memory 1630 stores the instructions executed by processor 1620.

Processor 1620 may include any suitable combination of hardware and software implemented in one or more modules to execute instructions and manipulate data to perform some or all of the described functions of wireless device 710. In some embodiments, processor 1620 may include, for example, one or more computers, one or more central processing units (CPUs), one or more microprocessors, one or more applications, and/or other logic.

Memory 1630 is generally operable to store instructions, such as a computer program, software, an application including one or more of logic, rules, algorithms, code, tables, etc. and/or other instructions capable of being executed by a processor. Examples of memory 1630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 710 may include additional components beyond those shown in FIG. 16 that may be responsible for providing certain aspects of the wireless device's functionality, including any of the functionality described above and/or any additional functionality (including any functionality necessary to support the solution described above).

Figure 17:
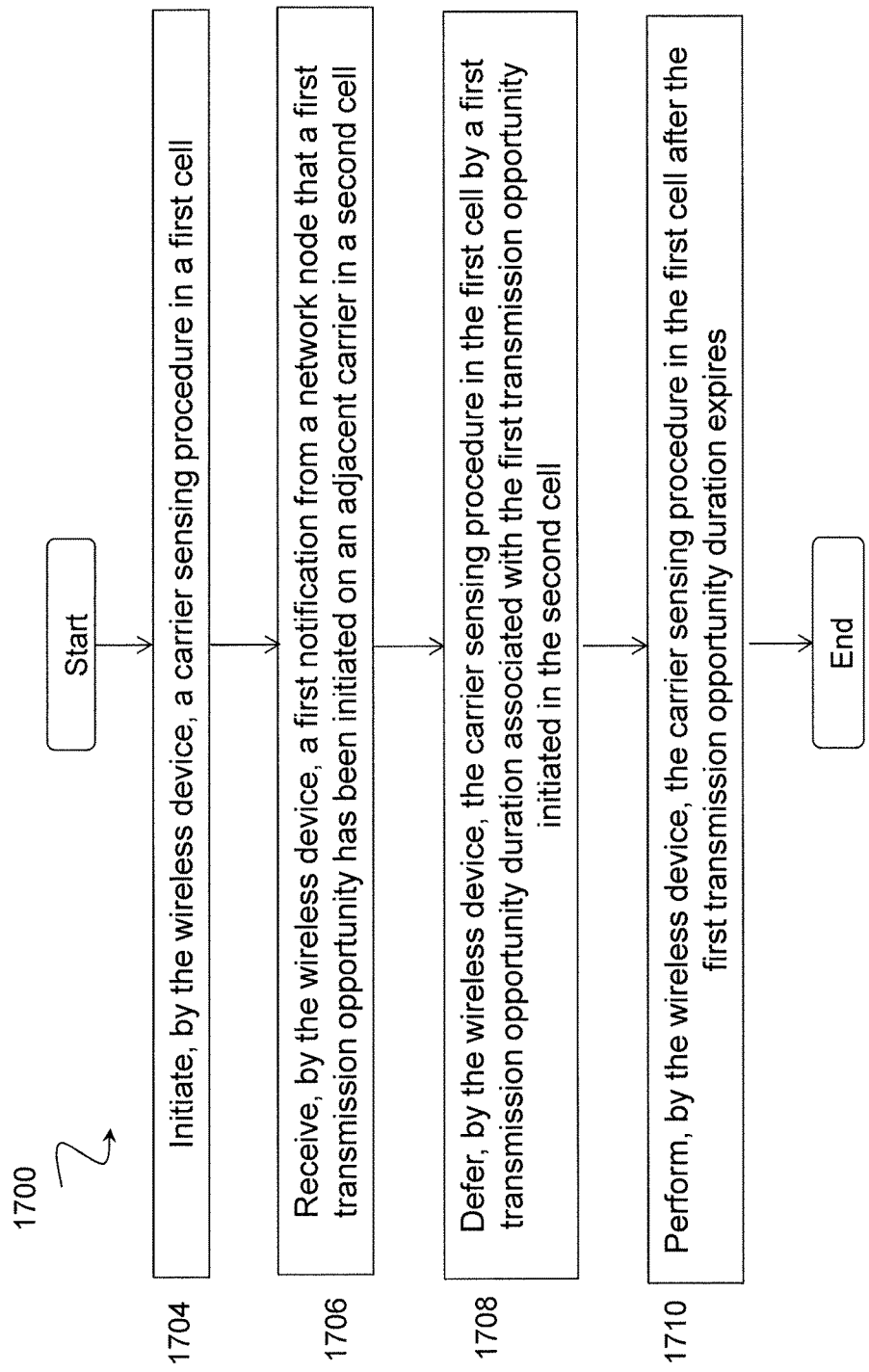
FIG. 17 illustrates an exemplary method by a wireless device for self-deferring LBT transmissions in a multi-carrier network, in accordance with certain embodiments.

FIG. 17 illustrates a method 1700 by a wireless device 710 for deferring transmissions in a multi-carrier network, in accordance with certain embodiments. The method begins at step 1704 when wireless device 710 initiates a carrier sensing procedure 1220B, 1320B in a first SCell 1210B, 1310B. In a particular embodiment, the carrier sensing procedure 1220B, 1320B comprises a listen before talk procedure performed by wireless device 710 to sense whether a channel associated with first SCell 1210B, 1310B is busy. Performing the carrier sensing procedure 1220B, 1320B may include detecting an energy level of the channel, in a particular embodiment. Again, the terms first and second are provided for example purposes only and may be interchanged.

At step 1706, wireless device 710 receives a first notification from a network node 1015 that a first TXOP 1224, 1324 has been initiated on an adjacent carrier in a second SCell 1210A, 1310A.

At step 1708, wireless device 710 defers the carrier sensing procedure 1220B, 1320B in the first SCell 1210B, 1310B by a first TXOP duration 1230, 1332 associated with first TXOP 1224, 1324 initiated in the second SCell 1210A, 1310A. In a particular embodiment, the first notification from network node 1015 indicates the first TXOP duration 1230, 1332 associated with first TXOP 1224, 1324.

At step 1710, wireless device 710 performs carrier sensing procedure 1220B, 1320B in the first SCell 1210B, 1310B after the first TXOP duration 1230, 1332 expires. In a particular embodiment, performing carrier sensing procedure 1220B, 1320B comprises initiating a new carrier sensing procedure. In other embodiments, performing carrier sensing procedure 1220B, 1320B may include resuming a previous carrier sensing procedure that was terminated before it was complete.

Figure 18:
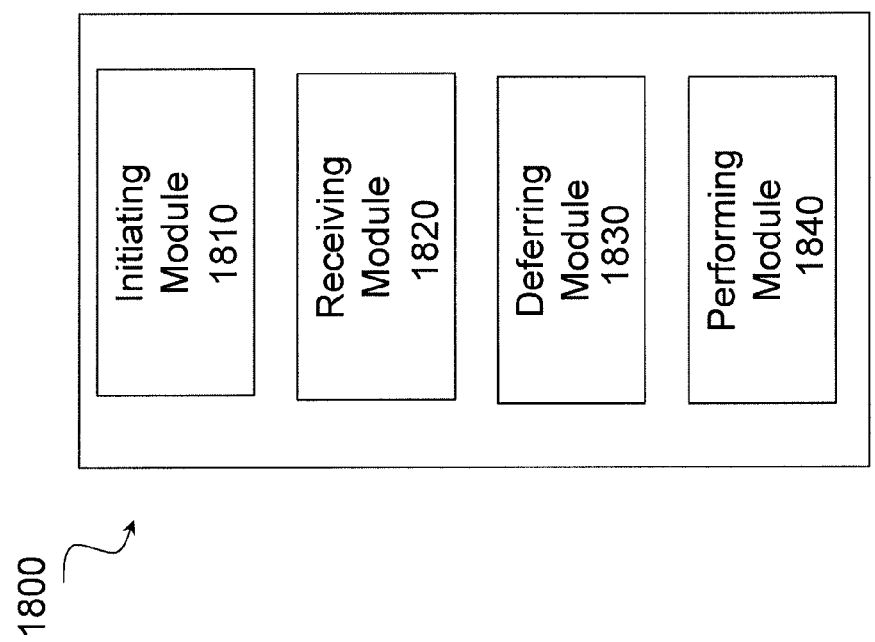
FIG. 18 illustrates an example computer networking virtual apparatus for self-deferring LBT transmissions in a multi-carrier network, according to certain embodiments.

In certain embodiments, the method similar to that described above with regard to the method performed by wireless device 710 may be performed by a computer networking virtual apparatus. FIG. 18 illustrates an example computer networking virtual apparatus 1800 for self-deferring transmissions in a multi-carrier network, according to certain embodiments. In certain embodiments, computer networking virtual apparatus 1800 may include at least one initiating module 1810, receiving module 1820, deferring module 1830, performing module 1840, and any other suitable modules for self-deferring transmissions in a multi-carrier network. In certain embodiments, computer networking virtual apparatus 1800 may alternatively or additionally include modules for performing steps similar to those described above with regard to the method illustrated and described in FIG. 17. In some embodiments, one or more of the initiating module 1810, receiving module 1820, deferring module 1830, performing module 1840, or any other suitable module may be implemented using one or more processors 1620 of FIG. 16. In certain embodiments, the functions of two or more of the various modules may be combined into a single module.

The at least one initiating module 1810 may perform the initiating functions of computer networking virtual apparatus 1800. For example, initiating module 1810 may initiate a carrier sensing procedure 1220B, 1320B in a first SCell 1210B, 1310B. In a particular embodiment, initiating module 1810 may include or be included in processor 1620. The initiating module 1810 may include analog and/or digital circuitry configured to perform any of the functions of the initiating module and/or processor 1620. The functions of the initiating module may, in certain embodiments, be performed in one or more distinct modules.

The receiving module 1820 may perform the receiving functions of computer networking virtual apparatus 1800. For example, receiving module 1820 may receive a first notification from a network node 1015 that a TXOP 1224, 1324 has been initiated on an adjacent carrier in a second SCell 1210A, 1310A. In a particular embodiment, receiving module 1820 may include or be included in transceiver 1610. The receiving module 1820 may include analog and/or digital circuitry configured to perform any of the functions of the receiving module and/or transceiver 1610. The functions of the receiving module may, in certain embodiments, be performed in one or more distinct modules.

The deferring module 1830 may perform the deferring functions of computer networking virtual apparatus 1800. For example, deferring module 1830 may defer the carrier sensing procedure 1220B, 1320B in the first SCell 1210B, 1310B by a first TXOP duration 1230, 1332 associated with the first TXOP 1224, 1324 initiated in the second SCell 1210A, 1310A. In a particular embodiment, deferring module 1830 may include or be included in processor 1620. The deferring module 1830 may include analog and/or digital circuitry configured to perform any of the functions of the deferring module and/or processor 1620. The functions of the deferring module may, in certain embodiments, be performed in one or more distinct modules.

The performing module 1840 may perform the performing functions of computer networking virtual apparatus 1800. For example, performing module 1840 may perform the carrier sensing procedure 1220B, 1320B in the first SCell 1210A, 1310A after the first TXOP duration expires 1234, 1332. In a particular embodiment, performing the carrier sensing procedure 1220B, 1320B may include resuming a carrier sensing procedure 1220B, 1320B that was previously being performed when it was determined that the second SCell 1210A, 1310A had initiated the first TXOP 1224, 1324. In other embodiments, performing the carrier sensing procedure 1220B, 1320B may include initiating a new carrier sensing procedure. In a particular embodiment, performing module 1840 may include or be included in processor 1620. The performing module 1840 may include analog and/or digital circuitry configured to perform any of the functions of the performing module and/or processor 1620. The functions of performing module 1840 may, in certain embodiments, be performed in one or more distinct modules.

Other embodiments of computer networking virtual apparatus 1800 may include additional components beyond those shown in FIG. 18 that may be responsible for providing certain aspects of the functionality of wireless device 710, including any of the functionality described above and/or any additional functionality (including any functionality necessary to support the solutions described above). The various different types of wireless devices 710 may include components having the same physical hardware but configured (e.g., via programming) to support different radio access technologies, or may represent partly or entirely different physical components.

Figure 19:
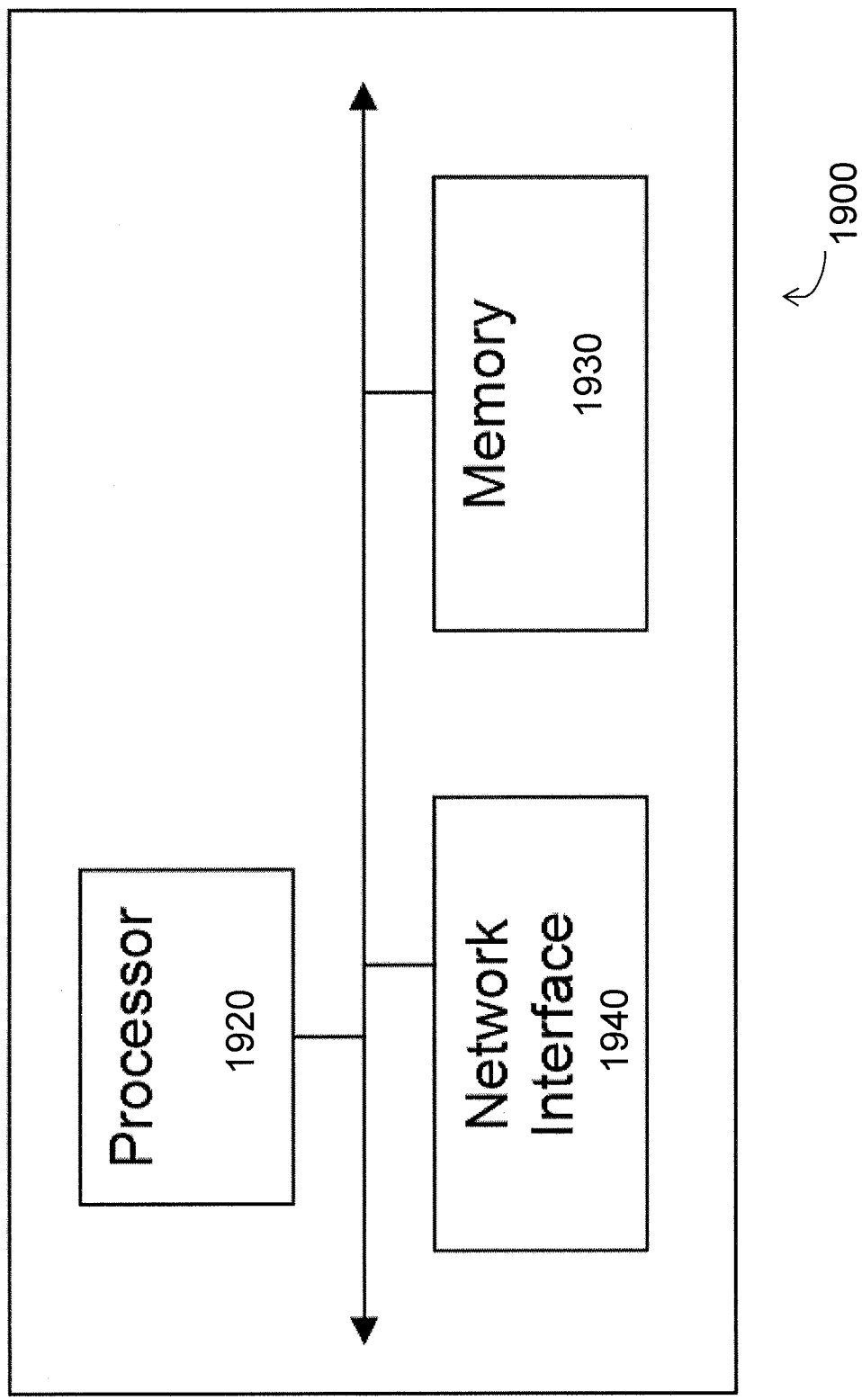
FIG. 19 illustrates an exemplary radio network controller or core network node, in accordance with certain embodiments.

FIG. 19 is a block schematic of an exemplary radio network controller or core network node 1900, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 1900 include processor 1920, memory 1930, and network interface 1940. In some embodiments, processor 1920 executes instructions to provide some or all of the functionality described above as being provided by the network node, memory 1930 stores the instructions executed by processor 1920, and network interface 1940 communicates signals to any suitable node, such as a gateway, switch, router, Internet, Public Switched Telephone Network (PSTN), network nodes 1015, radio network controllers or core network nodes 1900, etc.

Processor 1920 may include any suitable combination of hardware and software implemented in one or more modules to execute instructions and manipulate data to perform some or all of the described functions of the radio network controller or core network node 1900. In some embodiments, processor 1920 may include, for example, one or more computers, one or more central processing units (CPUs), one or more microprocessors, one or more applications, and/or other logic.

Memory 1930 is generally operable to store instructions, such as a computer program, software, an application including one or more of logic, rules, algorithms, code, tables, etc. and/or other instructions capable of being executed by a processor. Examples of memory 1930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1940 is communicatively coupled to processor 1920 and may refer to any suitable device operable to receive input for the network node, send output from the network node, perform suitable processing of the input or output or both, communicate to other devices, or any combination of the preceding. Network interface 1940 may include appropriate hardware (e.g., port, modem, network interface card, etc.) and software, including protocol conversion and data processing capabilities, to communicate through a network.

Other embodiments of the network node may include additional components beyond those shown in FIG. 19 that may be responsible for providing certain aspects of the network node's functionality, including any of the functionality described above and/or any additional functionality (including any functionality necessary to support the solution described above).

According to certain embodiments, a method for self-deferring transmissions in a multi-carrier network is implemented in a network node. The method includes determining, by a first controller seeking to initiate a carrier sensing procedure in a first cell, that a second cell associated with a second controller has initiated a first transmission opportunity on an adjacent carrier. The first controller determines a first transmission opportunity duration associated with the first transmission opportunity initiated in the second cell. The first transmission opportunity duration includes an uplink portion and a downlink portion for transmission in the second cell. The first controller defers the carrier sensing procedure to be performed in the first cell by the first transmission opportunity duration. The carrier sensing procedure in the first cell is performed after the first transmission opportunity duration expires.

According to certain embodiments, a network node for self-deferring transmissions in a multi-carrier network includes a memory for storing data and a first controller seeking to initiate a carrier sensing procedure in a first cell. The first controller determines that a second cell associated with a second controller has initiated a first transmission opportunity on an adjacent carrier. The first controller determines a first transmission opportunity duration associated with the first transmission opportunity. The first transmission opportunity duration includes an uplink portion and a downlink portion for transmission in the second cell. The first controller defers the carrier sensing procedure to be performed in the first cell by the first transmission opportunity duration. The first controller performs the carrier sensing procedure in the first cell after the first transmission opportunity duration expires.

According to certain embodiments, a method for deferring transmissions in a multi-carrier network is implemented in a wireless device. The method includes initiating, by the wireless device, a carrier sensing procedure in a first cell. A first notification is received from a network node that a first transmission opportunity has been initiated on an adjacent carrier in a second cell. The carrier sensing procedure is deferred in the first cell by a first transmission opportunity duration associated with the first transmission opportunity initiated in the second cell. The first transmission opportunity duration includes an uplink portion and a downlink portion for transmission in the second cell. The wireless device performs the carrier sensing procedure in the first cell after the first transmission opportunity duration expires.

According to certain embodiments, a wireless device for deferring transmissions in a first cell in a multi-carrier network includes a transceiver for receiving signals from a network node and a processor in communication with the transceiver. The processor receives a first notification from the network node that a first transmission opportunity has been initiated on an adjacent carrier in a second cell. A carrier sensing procedure is deferred in the first cell for a first transmission opportunity duration associated with the first transmission opportunity initiated in the second cell. The first transmission opportunity duration includes an uplink portion and a downlink portion for transmission in the second cell. The carrier sensing procedure is performed in the first cell after the first transmission opportunity duration expires.

Certain embodiments facilitate the utilization of multi-carrier operation on unlicensed carriers. As another example, certain embodiments may avoid interference from downlink bursts on one licensed assisted access secondary cell to uplink bursts within the transmission opportunity of an adjacent secondary cell. Another technical advantage may be improved coexistence between LAA/LTE-U and Wi-Fi. Still another technical advantage may be the facilitation of multi-carrier operation in standalone LTE-U networks.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
CCA Clear Channel Assessment
CW Contention Window
DCF Distributed Coordination Function
DIFS DCF Inter-frame Spacing
DL Downlink
DRS Discovery Reference Signal
eNB evolved NodeB, base station
LAA Licensed-Assisted Access
LBT Listen before talk
MRBC Multiple Random Backoff Channels
PDCCH Physical Downlink Control Channel
PIFS PCF Inter-frame Spacing
PUSCH Physical Uplink Shared Channel
QoS Quality of Service
SCell Secondary Cell
SRBC Single Random Backoff Channel
SIFS Short Inter-frame Spacing
TTI Transmission-Time Interval
TXOP Transmission Opportunity
UE User Equipment
UL Uplink Control Information

The invention claimed is:
1. A method by a network node for self-deferring transmissions in a multi-carrier network, the method comprising:
 determining, by a first controller seeking to initiate a carrier sensing procedure in a first cell operating on a first carrier, that a second cell associated with a second controller has initiated a first transmission opportunity after a successful carrier sensing procedure, the first transmission opportunity on a second carrier that is adjacent to the first carrier;
 determining, by the first controller associated with the first cell, a first transmission opportunity duration associated with the first transmission opportunity initiated in the second cell;
 deferring, by the first controller, the carrier sensing procedure to be performed in the first cell, the carrier sensing procedure deferred by the first transmission opportunity duration associated with the first transmission opportunity initiated in the second cell; and
initiating the carrier sensing procedure in the first cell after the first transmission opportunity duration unless instructed by the second controller.

2. The method of claim 1, wherein the first controller and the second controller are co-located at the first network node such that the first cell and the second cell are co-located at the first network node.

3. The method of claim 1, further comprising:
determining, by the first controller, that a third cell associated with a third controller has initiated a second transmission opportunity on a third carrier that is adjacent to the first carrier; and
determining, by the first controller, a second transmission opportunity duration associated with the second transmission opportunity initiated in the third cell; and
deferring the carrier sensing procedure by the longer of the first transmission opportunity duration and the second transmission opportunity duration; and
performing the carrier sensing procedure in the first cell after the longer of the first transmission opportunity duration and the second transmission opportunity duration expires.

4. The method of claim 1, further comprising:
receiving, by the first controller associated with the first cell, notification from the second controller that the first transmission opportunity initiated in the second cell is terminated before an expected duration; and
initiating the carrier sensing procedure in the first cell during the first transmission opportunity.

5. The method of claim 1, wherein:
the carrier sensing procedure is being performed when it is determined that the second cell associated with the second controller has initiated the first transmission opportunity; and
initiating the carrier sensing procedure in the first cell after the first transmission opportunity duration expires comprises resuming the carrier sensing procedure.

6. The method of claim 1, wherein the first transmission opportunity duration comprises an uplink portion and a downlink portion for transmission in the second cell, the method further comprising:
performing a clear channel assessment in the first cell prior to the uplink portion of the first transmission opportunity duration; and
receiving, by the first controller, on an uplink during the uplink portion of the first transmission opportunity duration while the second controller is receiving on the uplink during the uplink portion of the first transmission.

7. The method of claim 1, wherein a length of the transmission opportunity duration is determined based on at least one of:
a decoded Wi-Fi preamble;
Wi-Fi NAV information associated with a second network node; and
a transmission opportunity configuration of the second network node, a downlink portion for transmission in the second cell at least partially coinciding in time with a downlink portion of a transmission opportunity of the second network node.

8. A network node for self-deferring transmissions in a multi-carrier network, the network node comprising:

a memory for storing data; and
a first processor seeking to initiate a carrier sensing procedure in a first cell operating on a first carrier, the first processor operable to:
determine that a second cell associated with a second processor has initiated a first transmission opportunity after a successful carrier sensing procedure, the first transmission opportunity on a second carrier that is adjacent to the first carrier;
determine a first transmission opportunity duration associated with the first transmission opportunity initiated in the second cell;
defer the carrier sensing procedure to be performed in the first cell, the carrier sensing procedure deferred by the first transmission opportunity duration associated with the first transmission opportunity initiated in the second cell; and
initiate the carrier sensing procedure in the first cell after the first transmission opportunity duration unless instructed by a second processor associated with the second cell.

9. The network node of claim 8, wherein the first processor and the second processor are co-located at the network node such that the first cell and the second cell are co-located at the network node.

10. The network node of claim 8, wherein the first processor is further operable to:
determine that a third cell associated with a third processor has initiated a second transmission opportunity on a third carrier that is adjacent to the first carrier; and
determine a second transmission opportunity duration associated with the second transmission opportunity initiated in the third cell; and
defer the carrier sensing procedure by a longer one of the first transmission opportunity duration and the second transmission opportunity duration; and
initiate the carrier sensing procedure in the first cell after the longer of the first transmission opportunity duration and the second transmission opportunity duration expires.

11. The network node of claim 8, wherein the first processor is further operable to:
receive notification from the second processor that the first transmission opportunity initiated in the second cell is terminated before an expected duration; and
initiate the carrier sensing procedure in the first cell during the first transmission opportunity.

12. The network node of claim 8, wherein:
the carrier sensing procedure is being performed when it is determined that the second cell associated with the second processor has initiated the first transmission opportunity; and
wherein when initiating the carrier sensing procedure in the first cell after the first transmission opportunity duration expires, the first processor resumes the carrier sensing procedure.

13. The network node of claim 8, wherein the first transmission opportunity duration comprises an uplink portion and a downlink portion for transmission in the second cell, the first processor is further operable to:
perform a clear channel assessment in the first cell prior to the uplink portion of the first transmission opportunity duration; and
receive, by the first controller, on an uplink during the uplink portion of the first transmission opportunity duration while the second controller is receiving on the uplink during the uplink portion of the first transmission duration.

14. The network node of claim 8, wherein a length of the transmission opportunity duration is determined based at least one of:
   a decoded Wi-Fi preamble;
   Wi-Fi NAV information associated with a second network node; and
   a transmission opportunity configuration of the second network node, a downlink portion for transmission in the second cell at least partially coinciding in time with a downlink portion of a transmission opportunity of the second network node.

15. A method by a wireless device for deferring transmissions in a multi-carrier network, the method comprising:
   initiating, by the wireless device, a carrier sensing procedure in a first cell operating on a first carrier;
   receiving, by the wireless device, a first notification from a network node that a first transmission opportunity has been initiated on a second cell operating on a second carrier after a successful carrier sensing procedure, the second carrier being adjacent to the first carrier;
   deferring, by the wireless device, the carrier sensing procedure in the first cell by a first transmission opportunity duration associated with the first transmission opportunity initiated in the second cell; and
   performing, by the wireless device, the carrier sensing procedure in the first cell after the first transmission opportunity duration unless instructed by a controller associated with the second cell.

16. The method of claim 15, wherein the notification from the network node indicates the first transmission opportunity duration.

17. The method of claim 15, wherein the carrier sensing procedure comprises a listen before talk procedure performed in the first cell, the listen before talk procedure comprising:
   sensing a channel associated with the first cell to determine whether the channel is busy; and
   if the channel is not busy, transmitting on an uplink after an expiration of a random backoff duration period.

18. The method of claim 15, further comprising:
   receiving a second notification that the first transmission opportunity initiated in the second cell is terminated before an expected duration; and
   performing the carrier sensing procedure in the first cell during the first transmission opportunity.

19. The method of claim 15, wherein the wireless device is performing the carrier sensing procedure when it is determined that the first transmission opportunity has been initiated in the second cell, and the method further comprises:
   ceasing the carrier sensing procedure for the first transmission opportunity duration; and
   resuming the carrier sensing procedure after the first transmission opportunity duration.

20. A wireless device for deferring transmissions in a first cell operating on a first carrier in a multi-carrier network, the wireless device comprising:
   a transceiver for receiving signals from a network node; and
   a first processor in communication with the transceiver, the processor operable to:
   receive a first notification from the network node that a first transmission opportunity has been initiated on a second carrier after a successful carrier sensing procedure, the e second carrier being adjacent to the first cell;
   defer a carrier sensing procedure in the first cell for a first transmission opportunity duration associated with the first transmission opportunity initiated in the second cell; and
   perform the carrier sensing procedure in the first cell after the first transmission opportunity duration unless instructed by a second processor associated with the second cell.

21. The wireless device of claim 20, wherein the notification from the network node indicates the first transmission opportunity duration.

22. The wireless device of claim 20, wherein the carrier sensing procedure comprises a listen before talk procedure performed in the first cell, the listen before talk procedure comprising:
   sensing a channel associated with the first cell to determine whether the channel is busy; and
   if the channel is not busy, transmitting on an uplink after an expiration of a random backoff duration period.

23. The wireless device of claim 20, wherein:
   the transceiver is further operable to receive a second notification that the first transmission opportunity initiated in the second cell terminated before an expected duration; and
   the first processor is further operable to perform the carrier sensing procedure in the first cell during the first transmission opportunity.

24. The wireless device of claim 20, wherein the first processor is performing the carrier sensing procedure when it is determined that the first transmission opportunity has been initiated in the second cell, and the method further comprises:
   ceasing the carrier sensing procedure for the first transmission opportunity duration; and
   resuming the carrier sensing procedure after the first transmission opportunity duration.

* * * * *